(12) United States Patent
Yokoyama et al.

(10) Patent No.: US 11,511,300 B2
(45) Date of Patent: Nov. 29, 2022

(54) CHEMICAL LIQUID DISPENSING APPARATUS AND CHEMICAL LIQUID DISCHARGING DEVICE

(71) Applicant: TOSHIBA TEC KABUSHIKI KAISHA, Tokyo (JP)

(72) Inventors: Shuhei Yokoyama, Mishima Shizuoka (JP); Satoshi Kaiho, Yokohama Kanagawa (JP); Ryutaro Kusunoki, Mishima Shizuoka (JP); Seiya Shimizu, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 1137 days.

(21) Appl. No.: 16/105,519

(22) Filed: Aug. 20, 2018

(65) Prior Publication Data

US 2019/0060936 A1    Feb. 28, 2019

(30) Foreign Application Priority Data

Aug. 22, 2017    (JP) .............................. JP2017-159486

(51) Int. Cl.
*B05B 12/00*    (2018.01)
*B01L 7/00*    (2006.01)
(Continued)

(52) U.S. Cl.
CPC .......... *B05B 12/004* (2013.01); *B01L 3/0268* (2013.01); *B01L 3/0293* (2013.01); *B01L 7/00* (2013.01); *B41J 2/14201* (2013.01); *B01J 2219/00378* (2013.01); *B01J 2219/00529* (2013.01); *B01J 2219/00693* (2013.01); *B01L 9/527* (2013.01); *B01L 2200/04* (2013.01);
(Continued)

(58) Field of Classification Search
None
See application file for complete search history.

(56) References Cited

U.S. PATENT DOCUMENTS 5,305,018 A * 4/1994 Schantz ............... B41J 2/14024
                                                          29/890.1
6,517,178 B1 * 2/2003 Yamamoto ............... B41J 2/211
                                                          347/15
(Continued)

FOREIGN PATENT DOCUMENTS

JP    H11319686 A    11/1999
JP    2005172682 A    6/2005
(Continued)

OTHER PUBLICATIONS

Japanese Office Action dated Apr. 6, 2021, mailed in counterpart Japanese Application No. 2017-159486, 8 pages (with translation).
(Continued)

*Primary Examiner* — Brian R Gordon
(74) *Attorney, Agent, or Firm* — Kim & Stewart LLP

(57) ABSTRACT

A liquid discharging device to be used with a liquid dispensing apparatus includes a discharging portion configured to discharge a liquid based on a control signal from the liquid dispensing apparatus on which the liquid discharging device is mounted, and a sheet material having a characteristic configured to be changed by the liquid dispensing apparatus after a discharge of the liquid by the discharging portion.

18 Claims, 22 Drawing Sheets

(51) Int. Cl.
  *B01L 3/02* (2006.01)
  *B41J 2/14* (2006.01)
  *G01N 35/10* (2006.01)
  *B01L 9/00* (2006.01)

(52) U.S. Cl.
  CPC ..... *B01L 2200/12* (2013.01); *B01L 2200/143* (2013.01); *B01L 2300/02* (2013.01); *B01L 2300/0609* (2013.01); *B41J 2002/1437* (2013.01); *B41J 2202/15* (2013.01); *G01N 2035/1041* (2013.01)

(56) References Cited

U.S. PATENT DOCUMENTS

| | | | |
|---|---|---|---|
| 6,561,608 B1* | 5/2003 | Yamamoto | B41J 2/211 347/15 |
| 8,702,187 B2 | 4/2014 | Ikeda et al. | |
| 9,821,552 B2 | 11/2017 | Yokoyama et al. | |
| 10,059,100 B2 | 8/2018 | Yokoyama et al. | |
| 2002/0055187 A1* | 5/2002 | Treptow | B01L 3/50851 435/287.1 |
| 2003/0012698 A1 | 1/2003 | Hirota et al. | |
| 2003/0148538 A1* | 8/2003 | Ng | B01L 3/0268 506/40 |
| 2003/0232380 A1 | 12/2003 | Maruyama | |
| 2007/0084997 A1 | 4/2007 | Noritake et al. | |
| 2007/0086924 A1* | 4/2007 | Moses | B01L 3/021 422/400 |
| 2007/0104615 A1 | 5/2007 | Hanafusa et al. | |
| 2007/0264656 A1* | 11/2007 | Kawamura | B01J 19/0046 427/2.11 |
| 2008/0284809 A1* | 11/2008 | Okawa | B41J 2/04515 347/17 |
| 2009/0220386 A1* | 9/2009 | Ferri | C08L 1/286 428/509 |
| 2010/0173803 A1 | 7/2010 | Pierik et al. | |
| 2013/0037623 A1 | 2/2013 | Yamaguchi | |
| 2013/0183769 A1 | 7/2013 | Tajima | |
| 2014/0339320 A1* | 11/2014 | Gantenbein | B05B 7/0018 239/71 |
| 2015/0367342 A1* | 12/2015 | Zhou | B01L 3/5023 156/390 |
| 2016/0279639 A1* | 9/2016 | Kim | G01N 21/6486 |
| 2017/0072417 A1 | 3/2017 | Eickhoff et al. | |
| 2018/0022091 A1* | 1/2018 | Alzona | B41J 2/14201 347/20 |
| 2018/0065361 A1 | 3/2018 | Yokoyama et al. | |
| 2018/0085745 A1 | 3/2018 | Yokoyama et al. | |
| 2018/0085746 A1 | 3/2018 | Yokoyama et al. | |
| 2018/0085757 A1 | 3/2018 | Yokoyama et al. | |
| 2018/0086077 A1 | 3/2018 | Yokoyama et al. | |
| 2018/0088142 A1 | 3/2018 | Yokoyama et al. | |
| 2018/0169649 A1 | 6/2018 | Yokoyama et al. | |
| 2018/0275154 A1 | 9/2018 | Morimoto | |

FOREIGN PATENT DOCUMENTS

| | | |
|---|---|---|
| JP | 2005351778 A | 12/2005 |
| JP | 2007237111 A | 9/2007 |
| JP | 2007275702 A | 10/2007 |
| JP | 2008044199 A | 2/2008 |
| JP | 2009050289 A | 3/2009 |
| JP | 2010500171 A | 1/2010 |
| JP | 2017-013042 A | 1/2017 |
| JP | 2017-015466 A | 1/2017 |
| JP | 2017036951 A | 2/2017 |
| JP | 2019037906 A | 3/2019 |
| JP | 2019037909 A | 3/2019 |
| WO | 2011024463 A1 | 3/2011 |
| WO | 2012036296 A1 | 2/2014 |
| WO | 2015127945 A1 | 9/2015 |

OTHER PUBLICATIONS

U.S. Appl. No. 16/105,225, filed Aug. 20, 2018.
U.S. Appl. No. 16/105,134, filed Aug. 20, 2018.
U.S. Appl. No. 16/105,107, filed Aug. 20, 2018.
U.S. Appl. No. 16/105,087, filed Aug. 20, 2018.
U.S. Appl. No. 16/104,976, filed Aug. 20, 2018.
U.S. Appl. No. 15/892,970, filed Feb. 9, 2018.
U.S. Appl. No. 15/891,166, filed Feb. 7, 2018.
U.S. Appl. No. 15/890,070, filed Feb. 6, 2018.
U.S. Appl. No. 15/889,807, filed Feb. 6, 2018.
Chinese Office Action dated Mar. 3, 2021, mailed in counterpart Chinese Application No. 201810754497.4, 9 pages (with translation).
Extended European Search Report dated Jan. 22, 2019, mailed in counterpart European Application No. 18189618.4, 9 pages.
Japanese Office Action dated Mar. 1, 2022, mailed in counterpart Japanese Application No. 2021-092887, 6 pages (with translation).
Japanese Office Action dated Mar. 1, 2022, mailed in counterpart Japanese Application No. 2021-092886, 6 pages (with translation).

* cited by examiner

CHEMICAL LIQUID DISPENSING APPARATUS AND CHEMICAL LIQUID DISCHARGING DEVICE

CROSS-REFERENCE TO RELATED APPLICATION

This application is based upon and claims the benefit of priority from Japanese Patent Application No. 2017-159486, filed Aug. 22, 2017, the entire contents of which are incorporated herein by reference.

FIELD

Embodiments described herein relate generally to a chemical liquid dispensing apparatus and a chemical liquid discharging device.

BACKGROUND

In a chemical liquid dispensing apparatus, a liquid is dispensed through a liquid discharging device. The liquid discharging device can be detachable from the chemical liquid dispensing apparatus so that it can be discarded after a single use to prevent contamination.

However, there is a problem in existing dispensing systems that the discharging device is reused or kept in service even though the discharging device is designed, or at least intended, only for single usage.

DETAILED DESCRIPTION

According to one embodiment, a liquid discharging device to be used with a liquid dispensing apparatus includes a discharging portion configured to discharge a liquid based on a control signal from the liquid dispensing apparatus on which the liquid discharging device is mounted, and a sheet material having a characteristic configured to be changed by the liquid dispensing apparatus after a discharge of the liquid by the discharging portion.

Hereinafter, chemical liquid dispensing apparatuses and chemical liquid discharging devices according to example embodiments will be described with reference to the drawings. It should be noted, that the particular embodiments explained below are some possible examples of chemical liquid dispensing apparatuses and chemical liquid discharging devices according to the present disclosure and do not limit the possible configurations, specifications, or the like of chemical liquid dispensing apparatuses and chemical liquid discharging devices according to the present disclosure. The drawings are schematic and are drawn with exaggeration and omissions for purposes of explanatory convenience. In general, components are not drawn to scale. The number of components, the dimensional ratio between different components, or the like does not necessarily match between different drawings or to actual devices.

First Embodiment

First, a discharging system according to the first embodiment discharges a predetermined chemical liquid by a piezo jet method will be described. For example, the discharging system discharges several picoliters (pL) to several microliters (µL) of the chemical liquid to a microplate or the like according to an operation of an operator. For example, the discharging system is used in a laboratory in a field such as biology, chemistry, or pharmacy.

Figure 1:
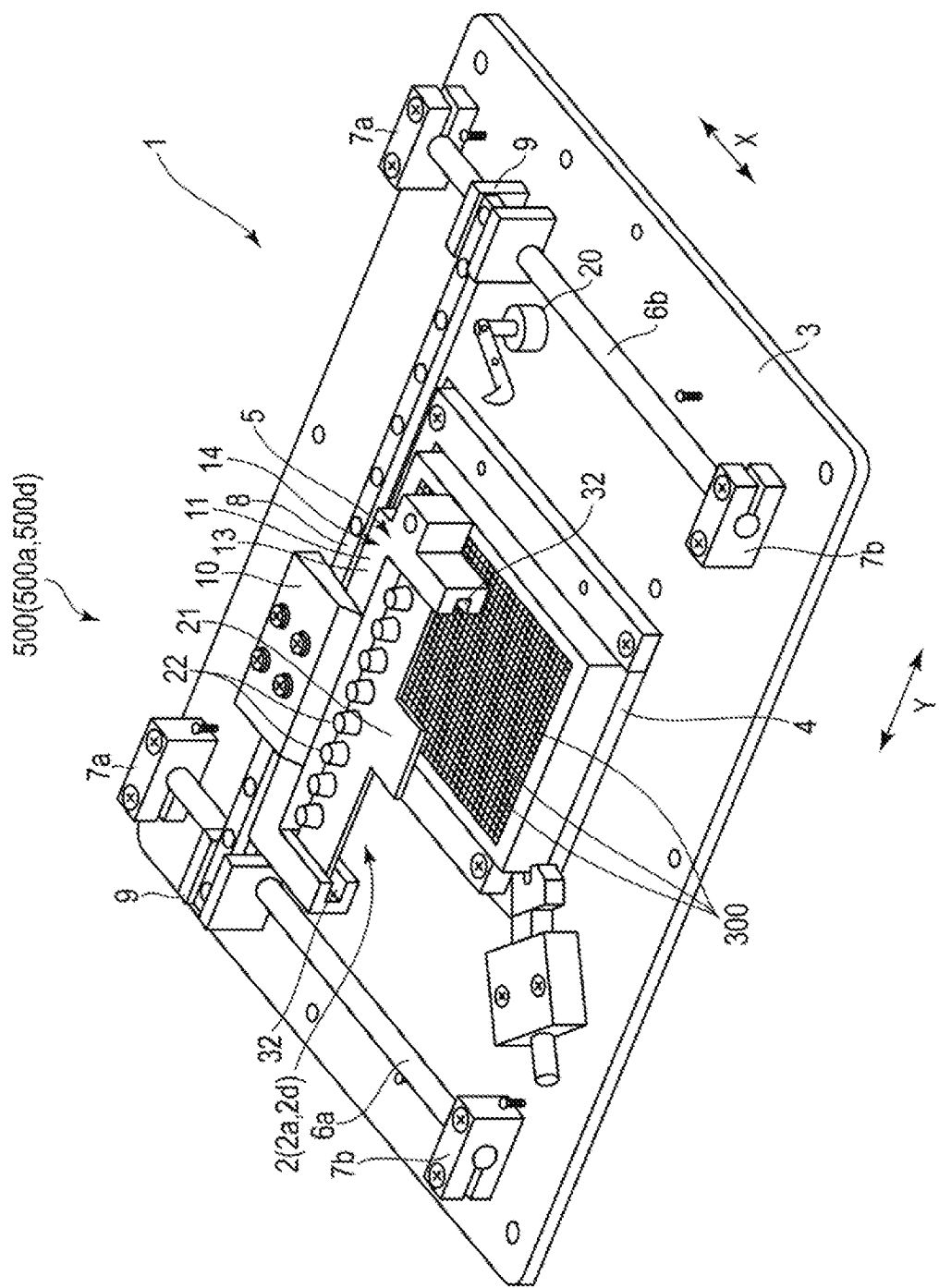
FIG. 1 is a perspective view showing a schematic configuration of a discharging system according to a first embodiment.
Figure 2:
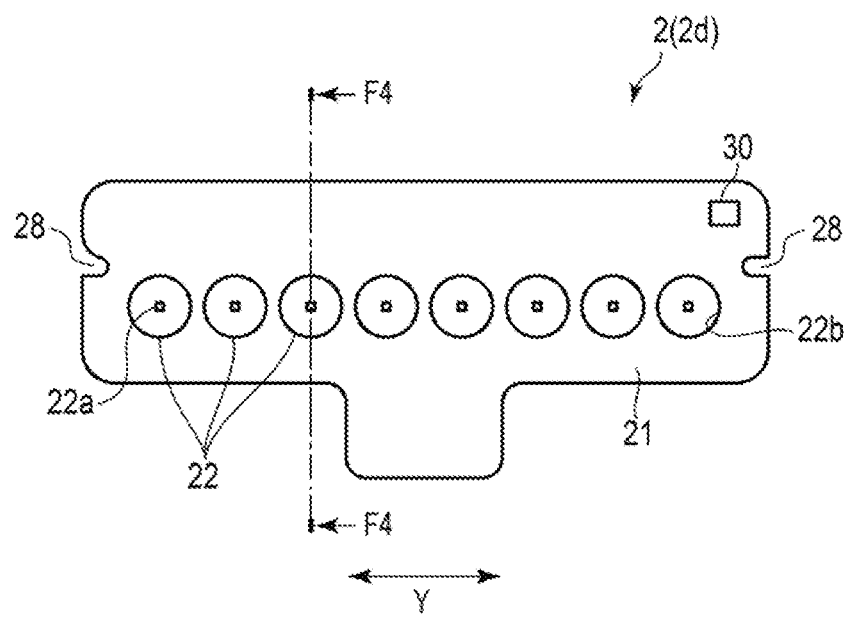
FIG. 2 is a plan view of an upper surface of a chemical liquid discharging device according to the first embodiment.
Figure 3:
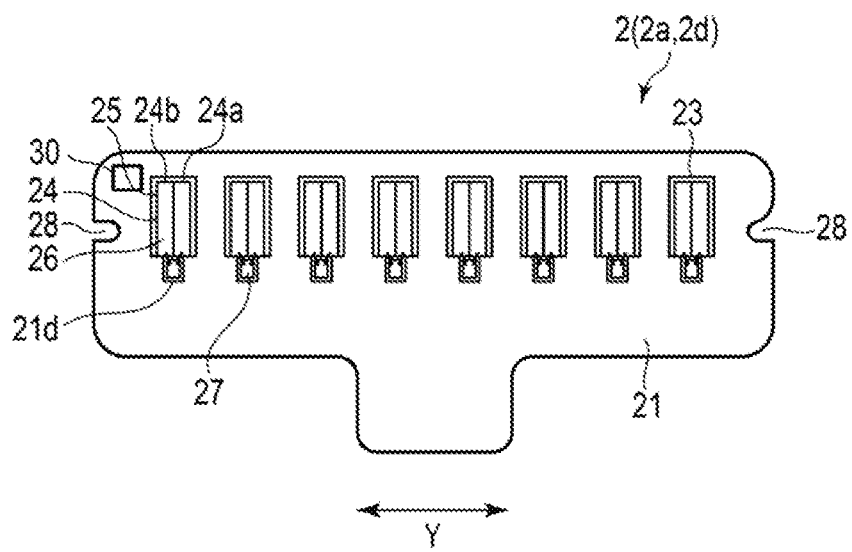
FIG. 3 is a plan view of a lower surface of the chemical liquid discharging device according to the first embodiment.
Figure 4:
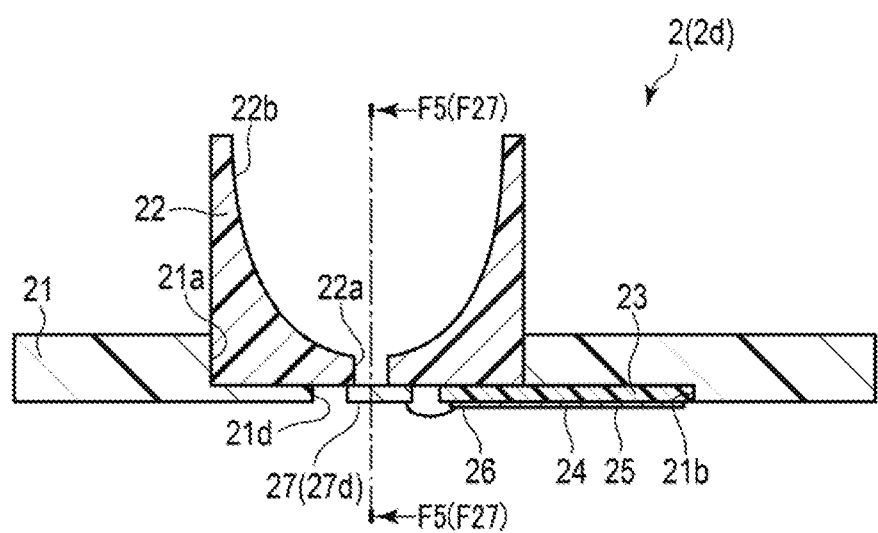
FIG. 4 is a cross-sectional view taken along a line F4-F4 of FIG. 2 according to the first embodiment.
Figure 5:
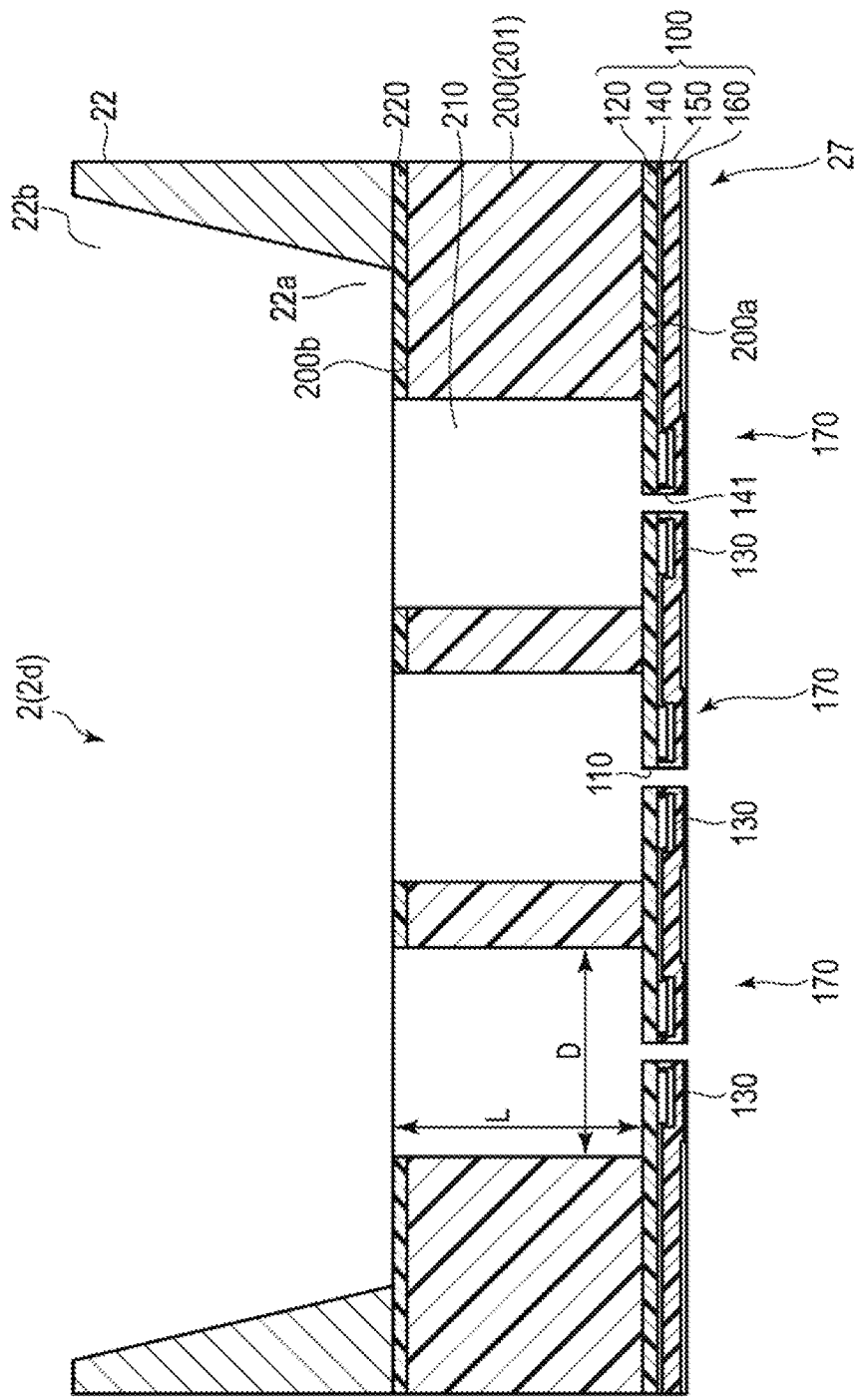
FIG. 5 is a cross-sectional view taken along a line F5-F5 of FIG. 4 according to the first embodiment.

A configuration example of the discharging system according to the first embodiment will be described with reference to FIGS. 1 to 5. FIG. 1 is a perspective view showing a schematic configuration of the discharging system 500. FIG. 2 is a top view of a chemical liquid discharging device 2. FIG. 3 is a bottom view showing a surface from which a chemical liquid is discharged from the chemical liquid discharging device 2. FIG. 4 is a cross-sectional view taken along a line F4-F4 in FIG. 2. FIG. 5 is a cross-sectional view taken along a line F5-F5 in FIG. 4.

As shown in FIG. 1, the discharging system 500 includes a chemical liquid dispensing apparatus 1, the chemical liquid discharging device 2, a host computer 18 that will be described later, and the like. The discharging system 500 may have more elements in addition to the elements depicted in FIG. 1, or some of the elements depicted in FIG. 1 may be omitted in some embodiments.

The chemical liquid dispensing apparatus 1 controls the chemical liquid discharging device 2 to dispense a chemical liquid filled in the chemical liquid discharging device 2.

The chemical liquid dispensing apparatus 1 includes abase 3 of a rectangular flat plate shape, a mounting module 5 (also referred to as a mounting portion) that mounts the chemical liquid discharging device 2, and a forming portion 20. In the first embodiment, it is assumed that the chemical liquid dispensing apparatus 1 dispenses the chemical liquid to a microplate 4 having 1536 holes. Here, the front and rear direction of the base 3 is referred to as an X direction, and the right and left direction of the base 3 is referred to as a Y direction. The X direction and the Y direction are orthogonal.

The microplate 4 is fixed to the base 3. The microplate 4 includes a plurality of well openings 300. Each well opening 300 of the microplate 4 holds a predetermined chemical liquid. For example, the chemical liquid is a chemical liquid including cells, blood cells, bacteria, plasma, antibodies, DNA, nucleic acids or proteins.

The chemical liquid dispensing apparatus 1 includes a pair of right and left X direction guide rails 6a and 6b extending in the X direction on both sides of the microplate 4 on the base 3. Both ends of each of the X direction guide rails 6a and 6b are fixed to fixing bases 7a and 7b protruding on the base 3.

A Y direction guide rail 8 extending in the Y direction is installed between the X direction guide rails 6a and 6b. Both ends of the Y direction guide rail 8 are fixed to an X direction moving base 9 that is movable in the X direction along the X direction guide rails 6a and 6b, respectively.

The Y direction guide rail 8 includes a Y direction moving base 10 that allows a mounting module 5 to move in the Y direction along the Y direction guide rail 8. The mounting module 5 is mounted on the Y direction moving base 10. The chemical liquid discharging device 2 is fixed to the mounting module 5.

The chemical liquid discharging device 2 is supported so as to be movable to an arbitrary position in the XY directions orthogonal to each other by a combination of an operation of a movement in the Y direction moving base 10 along the Y direction guide rail 8 in the Y direction and an operation of a movement in the X direction moving base 9 along the X direction guide rails 6a and 6b in the X direction.

The forming portion 20 opens a record portion 30 of the chemical liquid discharging device 2 based on a signal from a processor 15 (also referred to as a control circuit) that will be described later. The forming portion 20 is formed at a position corresponding to the position of the record portion 30. For example, in a case in which the chemical liquid discharging device 2 is located at a predetermined position (for example, an initial position or the like), the forming portion 20 is formed at a lower portion of the position where the record portion 30 is located.

The forming portion 20 includes a cutting blade or the like for opening the record portion 30. The forming portion 20 will be described in detail later.

In the mounting module 5, a slit 32 for fixing the chemical liquid discharging device 2 is formed. In a case where the chemical liquid discharging device 2 is inserted into the slit 32 from a front surface opening side of the slit 32, the chemical liquid discharging device 2 is fixed to the chemical liquid dispensing apparatus 1.

The mounting module 5 includes a driving circuit 11, a reading unit 14, and the like.

The driving circuit 11 drives the chemical liquid discharging device 2 based on a signal from the processor 15. For example, the driving circuit 11 supplies a signal, electric power, and the like to the chemical liquid discharging device 2 to discharge the chemical liquid from the chemical liquid discharging device 2.

The reading unit 14 reads an opening state of the record portion 30. That is, the reading unit 14 reads whether or not the record portion 30 is opened. The reading unit 14 is formed at a position corresponding to the position of the record portion 30. For example, in a case where the chemical liquid discharging device 2 is set in the mounting module 5, the reading unit 14 is formed at a lower portion or an upper portion of the position where the record portion 30 is located.

The reading unit 14 transmits a signal indicating whether or not the record portion 30 is opened to the processor 15.

For example, the reading unit 14 includes an irradiation unit that irradiates a laser to the record portion 30, a detection unit that detects a reflection of the laser, and the like. The reading unit 14 will be described in detail later.

The chemical liquid discharging device 2 discharges the chemical liquid based on a control of the chemical liquid dispensing apparatus 1.

The chemical liquid discharging device 2 includes a base member (also referred to as a base plate) 21 of a flat planar shape that is a plate of a rectangular plate shape. As shown in FIG. 2, a plurality of chemical liquid holding containers 22 is arranged in a row in the Y direction, on a surface side of the base member 21. In the first embodiment, eight chemical liquid holding containers 22 are described. However, the number is not limited to eight. As shown in FIG. 4, the chemical liquid holding container 22 is a container of a cylindrical shape having a bottom, of which an upper surface is opened. A chemical liquid holding container recessed portion 21a of a cylindrical shape is formed at a position corresponding to each chemical liquid holding container 22, on the surface side of the base member 21.

The bottom portion of the chemical liquid holding container 22 is adhered and fixed to the recessed portion 21a for the chemical liquid holding container. A lower surface opening 22a serving as a chemical liquid outlet port is formed at the center position on the bottom portion of the chemical liquid holding container 22. The opening area of an upper surface opening 22b of the chemical liquid holding container 22 is larger than the opening area of the lower surface opening 22a of the chemical liquid outlet port.

At both ends of the base member 21, mount fixing notches 28 (also referred to as engaging portions) for mounting and fixing the mounting module 5 are formed respectively. The mount fixing notch 28 is engaged with the mounting module 5. Two notches 28 of the base member 21 are formed in a notch shape of a semi-length cylindrical shape. The mount fixing notch 28 may be a notch shape of a semi-circular shape, a semi-elliptical shape, a triangular shape, or the like. In the first embodiment, the shapes of the two notches 28 are different from each other. Therefore, the left and right shapes of the base member 21 are different, and it is easy to identify the posture of the base member 21.

The chemical liquid discharging device 2 includes the record portion 30 on the base member 21. The base member 21 includes an opening of a predetermined size at a position where the record portion 30 is formed. The record portion 30 is formed so as to block the opening. In a case where the chemical liquid discharging device 2 is set in the chemical liquid dispensing apparatus 1, the chemical liquid discharging device 2 includes the record portion 30 at a position readable by the reading unit 14. In FIG. 2, the chemical liquid discharging device 2 includes the record portion 30 on the right side in Y axis direction.

The record portion 30 indicates whether the chemical liquid discharging device 2 has been used (also referred to as "use history"). That is, the record portion 30 indicates whether the chemical liquid is discharged from the chemical liquid holding container 22. The record portion 30 indicates the use history by whether or not the record portion 30 is opened in an opening state. That is, the record portion 30 is opened and the shape is changed based on the use history.

In a case where the record portion 30 is not opened, the record portion 30 indicates that the chemical liquid discharging device 2 has not been used as the use history. In a case where the record portion 30 is opened, the record portion 30 indicates that the chemical liquid discharging device 2 has been used as the use history.

The record portion 30 includes a material that allows the forming portion 20 to be opened. For example, the record portion 30 includes a sheet film or the like.

The record portion 30 is formed at the opening of the base member 21 at the time of manufacturing the chemical liquid discharging device 2. The record portion 30 is not opened in an initial state.

As shown in FIG. 3, the same number of electrical substrate 23 as the chemical liquid holding container 22 are arranged in row in the Y direction, on a rear surface side of the base member 21. The electrical substrate 23 is a flat plate member of a rectangular shape. As shown in FIG. 4, an electrical substrate recessed portion 21b of a rectangular shape for mounting the electrical substrate 23 and a chemical liquid discharge array portion opening 21d connected with the electrical substrate recessed portion 21b are formed, on the rear surface side of the base member 21. A base end portion of the electrical substrate recessed portion 21b extends to the vicinity of an upper end portion of the base member 21 in FIG. 3 (the position in the vicinity of the right end portion in FIG. 4). As shown in FIG. 4, a distal end portion of the electrical substrate recessed portion 21b extends to a position overlapping a portion of the chemical liquid holding container 22. The electrical substrate 23 is adhered and fixed to the electrical substrate recessed portion 21b.

An electrical substrate wiring 24 is patterned and formed on a surface opposite to an adhesive fixing surface of the electrical substrate recessed portion 21b, on the electrical substrate 23. Wiring patterns 24a and 24b respectively connected to a driving element 130 are formed on the electrical substrate wiring 24.

A control signal input terminal 25 for inputting an electrical signal (also referred to as a driving signal) from the driving circuit 11 is formed at one end portion of the electrical substrate wiring 24. An electrode terminal connection portion 26 is provided at the other end portion of the electrical substrate wiring 24.

The base member 21 includes the chemical liquid discharge array opening 21d. As shown in FIG. 3, the chemical liquid discharge array opening 21d is formed at a position overlapping with the chemical liquid holding container recessed portion 21a on the rear surface side of the base member 21, in an opening of a rectangular shape.

A chemical liquid discharge array 27 is adhered and fixed to the lower surface of the chemical liquid holding container 22 in a state where the chemical liquid discharge array 27 covers lower surface opening 22a of the chemical liquid holding container 22. The chemical liquid discharge array 27 is disposed at a position corresponding to the chemical liquid discharge array opening 21d of the base member 21.

As shown in FIG. 5, the chemical liquid discharge array 27 is formed by stacking a nozzle plate 100 and a pressure chamber structure 200. The nozzle plate 100 includes a nozzle 110 that discharges the chemical liquid, a diaphragm 120, the driving element 130 that is a driving unit, an insulation film 140 that insulates the driving element 130, a protection film 150 that is protection layer, a liquid repellence film 160. An actuator 170 includes the diaphragm 120 and the driving element 130. For example, a plurality of nozzles 110 is arranged in 3×3 rows. The plurality of nozzles 110 is positioned inside the lower surface opening 22a of the chemical liquid outlet port of the chemical liquid holding container 22. The chemical liquid holding container 22, the pressure chamber structure 200, the actuator 170, and the like form a discharging portion that discharges the chemical liquid.

For example, the diaphragm 120 is integrated with the pressure chamber structure 200. When a heat treatment is performed on a silicon wafer 201 in an oxygen atmosphere, a $SiO_2$ (silicon oxide) film is formed on the surface of the silicon wafer 201. The diaphragm 120 uses the $SiO_2$ film on the surface of the silicon wafer 201. The diaphragm 120 may be formed by depositing the $SiO_2$ film on the surface of the silicon wafer 201 by a CVD (Chemical Vapor Deposition) method.

The film thickness of the diaphragm 120 is preferably in a range of 1 to 30 μm. The diaphragm 120 may use a semiconductor material such as SiN (silicon nitride), $Al_2O_3$ (aluminum oxide), or the like, instead of the $SiO_2$ film.

The driving element 130 is formed in each nozzle 110. The driving element 130 is an annular shape surrounding the nozzle 110. The shape of the driving element 130 is not limited, and may be, for example, a C shape in which a portion of the circular ring is cut out.

The driving element 130 is electrically connected to the electrode terminal connection portion 26. The driving element 130 is driven by electric power supplied from the electrode terminal connection portion 26.

The driving element 130 includes a piezoelectric film that is a piezoelectric material, and uses PZT (Pb (Zr, Ti) $O_3$: lead zirconate titanate). For example, a piezoelectric film provided in the driving element 130 may use a piezoelectric material such as PTO ($PbTiO_3$: lead titanate), PMNT (Pb $(Mg_{1/3}Nb_{2/3})O_3$—$PbTiO_3$), PZNT (Pb $(Zn_{1/3}Nb_{2/3})O_3$—$PbTiO_3$, KNN (a compound of $KNbO_3$ and $NaNbO_3$), ZnO, and AlN may be used.

The piezoelectric film provided in the driving element 130 generates a polarization in the thickness direction. In a case where an electric field in the same direction as the polarization is applied to the driving element 130, the driving element 130 extends or contracts in a direction orthogonal to the electric field direction. That is, the driving element 130 contracts or extends in a direction orthogonal to the film direction.

The nozzle plate 100 includes the protection film 150. The protection film 150 includes a chemical liquid passage portion 141 of a cylindrical shape that is connected to the nozzle 110 of the diaphragm 120.

The nozzle plate 100 includes the liquid repellence film 160 that covers the protection film 150. For example, the liquid repellence film 160 is formed by spin-coating, for example, a silicone resin having a characteristic of repelling a chemical liquid. The liquid repellence film 160 may also be formed by a fluorinated resin material or the like.

The pressure chamber structure 200 includes a warp reduction film 220 that is a warp reduction layer on a surface opposite to the diaphragm 120. The pressure chamber structure 200 includes a pressure chamber 210 that penetrates the warp reduction film 220, reaches the position of the diaphragm 120, and is connected to the nozzle 110. For example, the pressure chamber 210 is formed in a circular shape positioned on the same axis as the nozzle 110.

The pressure chamber 210 includes an opening connected to the lower surface opening 22a of the chemical liquid holding container 22. It is preferable that the size L in the depth direction of the opening of the pressure chamber 210 is larger than the size D in the width direction of the opening of the pressure chamber 210. The size L in the depth direction is set to be larger than the size D in the width direction. Therefore, the pressure applied to the chemical liquid in the pressure chamber 210 may delay an escape to the chemical liquid holding container 22 by a vibration of the diaphragm 120 of the nozzle plate 100.

In the pressure chamber structure 200, the side on which the diaphragm 120 of the pressure chamber 210 is disposed is referred to a first surface 200a and the side on which the warp reduction film 220 is disposed is referred to a second surface 200b. The chemical liquid holding container 22 is adhered to the side of the warp reduction film 220 of the pressure chamber structure 200 by, for example, an epoxy type adhesive. The pressure chamber 210 of the pressure chamber structure 200 is connected to the lower surface opening 22a of the chemical liquid holding container 22 by an opening of the side of the warp reduction film 220.

The diaphragm 120 deforms in the thickness direction by an operation of the driving element 130 of a surface shape. The chemical liquid discharging device 2 discharges the chemical liquid supplied to the nozzle 110 by a pressure change generated in the pressure chamber 210 of the pressure chamber structure 200 due to the deformation of the diaphragm 120.

Next, the forming portion 20 will be described.

Figure 6A:
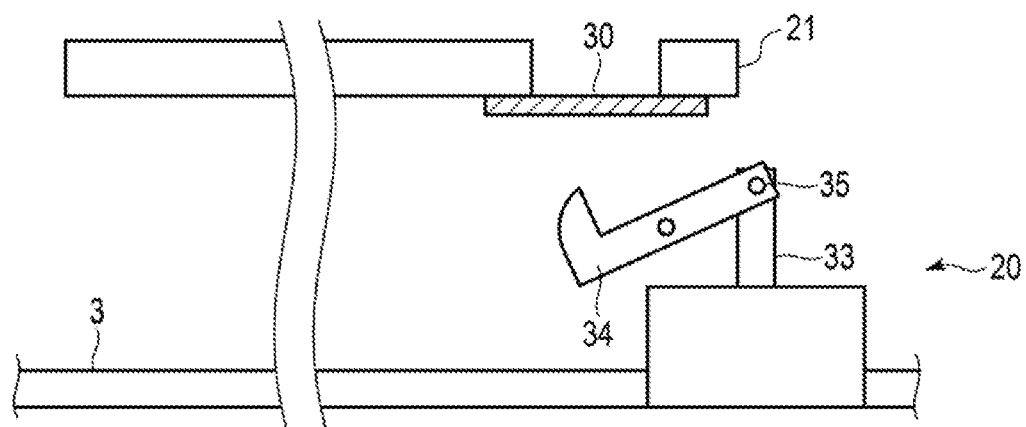
FIGS. 6A and 6B are diagrams of a forming portion according to the first embodiment.
Figure 6B:
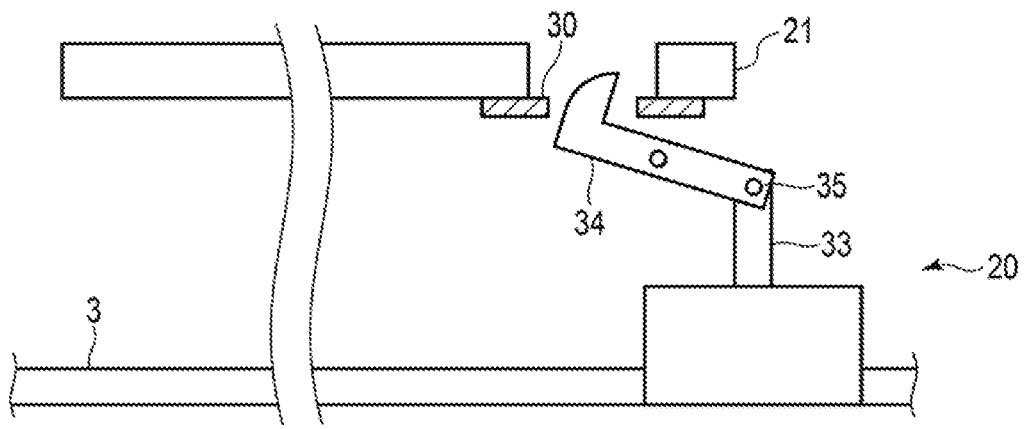

FIGS. 6A and 6B are diagrams showing a configuration example of the forming portion 20. FIG. 6A shows a default state of the forming portion 20. FIG. 6B shows a state in which the forming portion 20 performs an opening operation.

As shown in FIGS. 6A and 6B, the forming portion 20 includes a support column 33, a cutting blade 34, a rotary solenoid 35, and the like.

The support column 33 supports the cutting blade 34 and the rotary solenoid 35 at a predetermined height. The support column 33 is installed on the base 3.

The cutting blade 34 is installed on the upper end of the support column 33 through the rotary solenoid 35. The cutting blade 34 includes a convex portion facing upward a tip. The cutting blade 34 has a blade on the convex portion.

The rotary solenoid 35 is installed at the tip of the support column 33. A rotary portion of the rotary solenoid 35 is connected to the cutting blade 34. That is, the rotary solenoid 35 is connected to the cutting blade 34 so that the cutting blade 34 is rotatable.

The rotary solenoid 35 rotates the cutting blade 34 based on a signal from the processor 15. For example, the rotary solenoid 35 rotates the cutting blade 34 by rotating a rotation portion using electric power of a forming portion control circuit 19 or the like that will be described later, based on the signal from the processor 15.

As shown in FIG. 6A, the rotary solenoid 35 maintains the cutting blade 34 in a state the cutting blade 34 is not in contact with the record portion 30 in an initial state.

As shown in FIG. 6B, the rotary solenoid 35 rotates the cutting blade 34 by the signal from the processor 15 and opens the record portion 30.

Next, the reading unit 14 will be described.

Figure 7A:
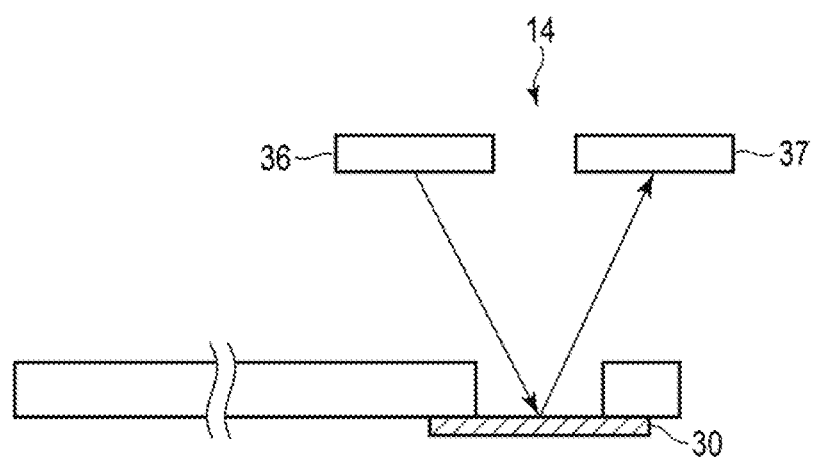
FIGS. 7A and 7B are diagram of a reading unit according to the first embodiment.
Figure 7B:
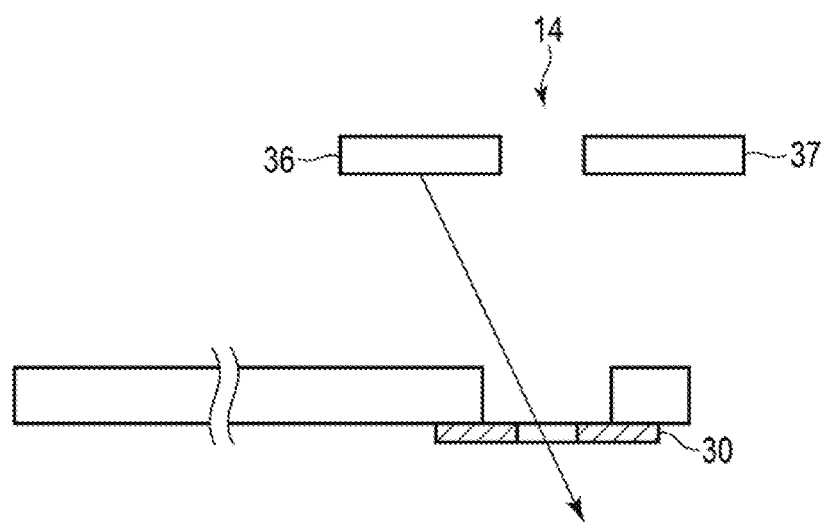

FIGS. 7A and 7B are diagrams showing a configuration example of the reading unit 14. FIG. 7A shows an example of a case where the record portion 30 is not opened. FIG. 7B shows an example of a case where the record portion 30 is opened.

As shown in FIGS. 7A and 7B, the reading unit 14 includes an irradiation unit 36, a detection unit 37, and the like.

The irradiation unit 36 irradiates the record portion 30 with light such as a laser at a predetermined angle. The irradiation unit 36 may irradiate visible light or may irradiate invisible light. The irradiation unit 36 irradiates the record portion 30 with the light at an angle at which the detection unit 37 is able to detect reflection light from the record portion 30. For example, the irradiation unit 36 includes an LED light source or the like.

The detection unit 37 detects the reflection light of the light irradiated to the record portion 30 by the irradiation unit 36. In a case where the detection unit 37 detects the reflection light, the detection unit 37 transmits a predetermined signal (also referred to as detection signal) to the processor 15. For example, the detection unit 37 is a photodiode or the like.

FIG. 7A shows an example of a case where the detection unit 37 detects the reflection light. As shown in FIG. 7A, the irradiation unit 36 irradiates the record portion 30 with the light. Since the record portion 30 is not opened, the record portion 30 reflects the light to the detection unit 37. As a result, the detection unit 37 detects the reflection light.

FIG. 7B shows an example of a case where the detection unit 37 does not detect the reflection light. As shown in FIG. 7B, the irradiation unit 36 irradiates the record portion 30 with the light. Since the record portion 30 is opened, the record portion 30 does not reflect the light. As a result, the detection unit 37 does not detect the reflection light.

The reading unit 14 transmits the detection signal of the detection unit 37 to the processor 15 as a signal indicating that the record portion 30 is not opened.

Next, a control system of the discharging system 500 will be described.

Figure 8:
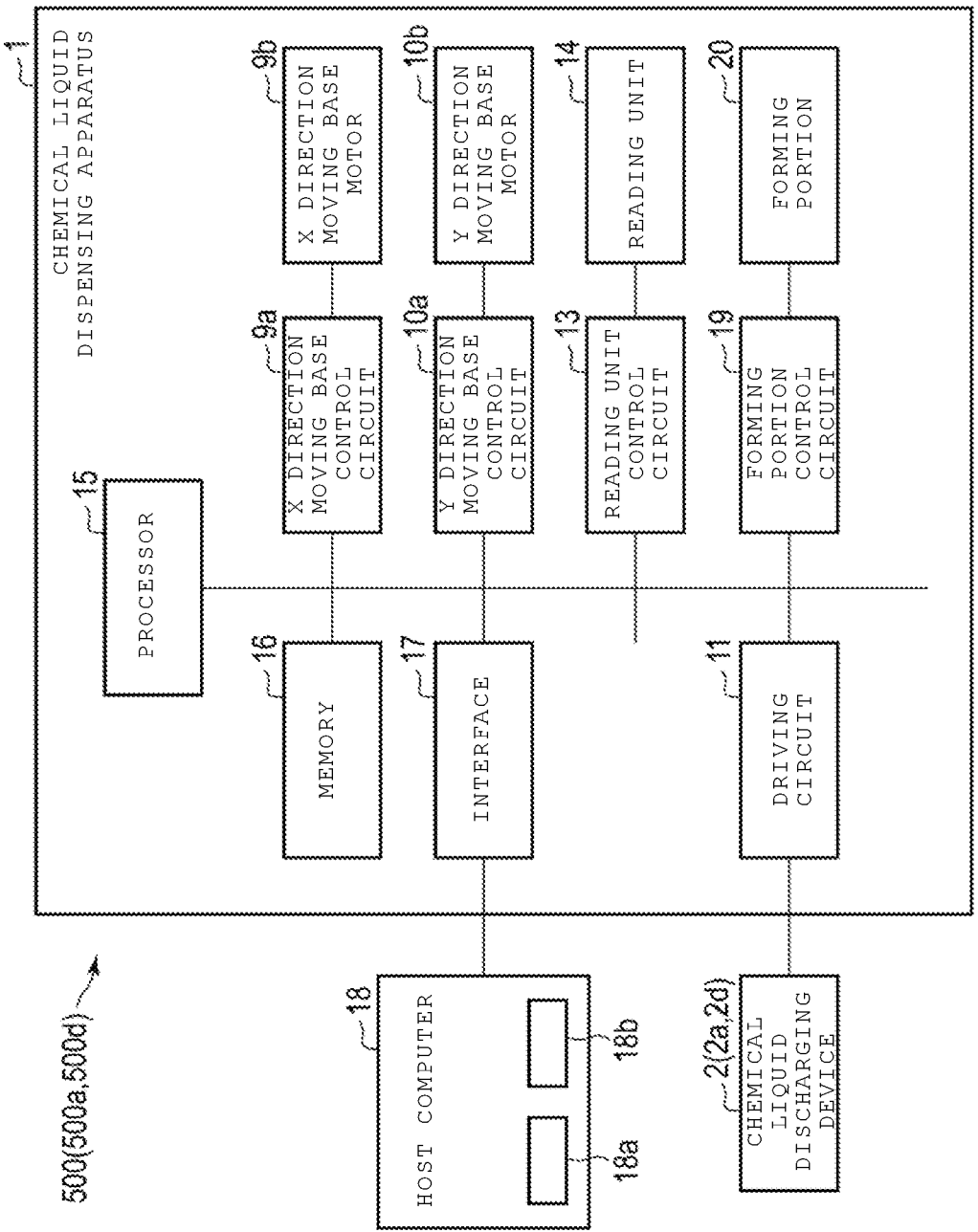
FIG. 8 is a block diagrams of a control system of the discharging system according to the first embodiment.

FIG. 8 is a block diagram showing the control system of the discharging system 500.

As described above, the discharging system 500 includes the chemical liquid dispensing apparatus 1, the chemical liquid discharging device 2, the host computer 18, and the like.

The host computer 18 controls the chemical liquid dispensing apparatus 1 according to the operation of the operator. The host computer 18 includes an operation unit 18a, a display unit 18b, and the like. The host computer 18 includes a processor, a RAM, a ROM, an NVM, and the like.

The operation unit 18a receives an input of the operation of the operator. For example, the operation unit 18a is a keyboard, a mouse, a touch panel, or the like.

The display unit 18b displays various kinds of information by a control of the processor 15. For example, the display unit 18b includes a liquid crystal monitor. In a case where the operation unit 18a includes a touch panel or the like, the display unit 18b may be integrated with the operation unit 18a.

The host computer 18 receives various operations through the operation unit 18a. For example, the host computer 18 receives an operation indicating that the chemical liquid holding container 22 is filled with the chemical liquid. The host computer 18 receives an operation of discharging the chemical liquid from the chemical liquid holding container 22.

In a case where the host computer 18 receives the operation of discharging the chemical liquid from the chemical liquid holding container 22, the host computer 18 transmits a signal for discharging the chemical liquid to the chemical liquid dispensing apparatus 1.

The host computer 18 may receive an operation for each chemical liquid holding container 22. For example, the host computer 18 may receive the operation indicating that the filling of the chemical liquid or the operation of discharging the chemical liquid for each chemical liquid holding container 22.

As shown in FIG. 8, the chemical liquid dispensing apparatus 1 includes an X direction moving base control circuit 9a, an X direction moving base motor 9b, a Y direction moving base control circuit 10a, a Y direction moving base motor 10b, the driving circuit 11, a reading unit control circuit 13, the reading unit 14, the processor 15, a memory 16, an interface 17, the forming portion control circuit 19, the forming portion 20, and the like. Such units are connected to each other through a data bus. The chemical liquid dispensing apparatus 1 may have more elements in addition to the elements depicted in FIG. 8, or some of the elements depicted in FIG. 8 may be omitted in some embodiments.

The processor 15 has a function of controlling all operations of the chemical liquid dispensing apparatus 1. The processor 15 may include an internal cache, various interfaces, and the like. The processor 15 enables various processes by executing a program stored in the internal cache, the memory 16, or the like in advance.

Some of the various functions achieved by the execution of the program by the processor 15 may be implemented by a hardware circuit. In this case, the processor 15 controls a function of executed by the hardware circuit.

The memory 16 stores various data. For example, the memory 16 stores a control program, a control data, and the like. The control program and the control data are incorporated in advance according to a specification of the chemical liquid dispensing apparatus 1. The control program is a program or the like supporting the function realized by the chemical liquid dispensing apparatus 1.

The memory 16 temporarily stores data or the like under processing of the processor 15. The memory 16 may store data necessary for executing an application program, an execution result of the application program, and the like.

The interface 17 is an interface for transmitting and receiving data to and from the host computer 18. For example, the interface 17 is connected to the host computer 18 through a wired or wireless line. For example, the interface 17 may support a LAN connection, a USB connection, or a Bluetooth® connection.

The X direction moving base control circuit 9a drives the X direction moving base motor 9b based on a signal from the processor 15. The X direction moving base control circuit 9a drives the X direction moving base motor 9b by supplying a signal or electric power to the X direction moving base motor 9b.

The X direction moving base motor 9b moves the X direction moving base 9 in the X direction. For example, the X direction moving base motor 9b is connected to the X direction moving base 9 through a gear or the like and moves the X direction moving base 9 in the X direction.

The Y direction moving base control circuit 10a drives the Y direction moving base motor 10b based on a signal from the processor 15. The Y direction moving base control circuit 10a drives the Y direction moving base motor 10b by supplying a signal or electric power to the Y direction moving base motor 10b.

The Y direction moving base motor 10b moves the Y direction moving base 10 in the Y direction. For example, the Y direction moving base motor 10b is connected to the Y direction moving base 10 through a gear or the like and moves the Y direction moving base 10 in the Y direction.

The reading unit control circuit 13 drives the reading unit 14 according to a signal from the processor 15. For example, the reading unit control circuit 13 supplies electric power to the irradiation unit 36 of the reading unit 14. The reading unit control circuit 13 transmits the detection signal of the detection unit 37 of the reading unit 14 to the processor 15.

The forming portion control circuit 19 drives the forming portion 20 according to a signal from the processor 15. For example, the forming portion control circuit 19 supplies electric power to the rotary solenoid 35. In a case where the rotary solenoid 35 is rotated by a predetermined angle, the forming portion control circuit 19 stops the rotation. The predetermined angle is an angle for opening the record portion 30.

The chemical liquid discharging device 2, the driving circuit 11, the reading unit 14, and the forming portion 20 are as described above.

Next, the function implemented by the processor 15 of the chemical liquid dispensing apparatus 1 will be described. The following function is implemented by the processor 15 executing the program stored in the memory 16 or the like.

First, the processor 15 has a function of reading the use history from the record portion 30.

The processor 15 determines whether or not the chemical liquid discharging device 2 is set in the mounting module 5. For example, the processor 15 determines whether or not the chemical liquid discharging device 2 is set in the mounting module 5 according to a signal from a sensor.

In a case where it is determined that the chemical liquid discharging device 2 is set in the mounting module 5, the processor 15 reads an opening state (shape) of the record portion 30 through the reading unit 14. That is, the processor 15 requests a signal indicating the opening state of the record portion 30 to the reading unit 14. The processor 15 acquires the opening state of the record portion 30 based on the signal from the reading unit 14.

In a case where the chemical liquid discharging device 2 is located at a position where the reading unit 14 is not able to read the opening state of the record portion 30, the processor 15 controls the X direction moving base motor 9b or the Y direction moving base motor 10b to move the chemical liquid discharging device 2 to the position where the reading unit 14 is able to read the record portion 30.

In a case where the record portion 30 is opened, the processor 15 determines that the record portion 30 indicates that the record portion 30 has been used as the use history. In a case where the record portion 30 is not opened, the processor 15 determines that the record portion 30 indicates that the record portion 30 has not been used as the use history.

The processor 15 has a function of discharging the chemical liquid from the chemical liquid discharging device 2 based on the use history indicated by the opening state of the record portion 30.

In a case where it is determined that the chemical liquid discharging device 2 has not been used according to the use history, the processor 15 discharges the chemical liquid from the chemical liquid discharging device 2.

For example, the operator supplies a predetermined amount of the chemical liquid to the chemical liquid holding container 22 from the upper surface opening 22b of the chemical liquid holding container 22 by a pipette or the like. The chemical liquid is held on the inner surface of the chemical liquid holding container 22. The lower surface opening 22a of the bottom portion of the chemical liquid holding container 22 is connected to the chemical liquid discharge array 27. The chemical liquid held in the chemical liquid holding container 22 is filled in each pressure chamber 210 of the chemical liquid discharge array 27 through the lower surface opening 22a of the lower surface of the chemical liquid holding container 22.

The chemical liquid held in the chemical liquid discharging device 2 includes any of, for example, a low molecular weight compound, a fluorescent reagent, a protein, an antibody, a nucleic acid, a plasma, a bacteria, a blood cell or a cell. In general, a main solvent of the chemical liquid that is a substance having the largest weight ratio or volume ratio is water, glycerin, and dimethylsulfoxide.

In a case where the operator fills the chemical liquid, the operator inputs an operation of discharging the chemical liquid to the operation unit 18a of the host computer 18. The operator may input the operation of discharging the chemical liquid from a specific chemical liquid holding container 22.

In a case where the host computer 18 receives the operation of discharging the chemical liquid, the host computer 18 transmits a signal (also referred to as a discharge signal) instructing the discharge of the chemical liquid with respect to the chemical liquid dispensing apparatus 1. The discharge signal may be an instruction of the discharge of the chemical liquid from a specific chemical liquid holding container 22.

The processor 15 receives the discharge signal through the interface 17. In a case where the acquired use history indicates that the chemical liquid discharging device 2 has not been used, the processor 15 causes the chemical liquid discharging device 2 to discharge the chemical liquid based on the discharge signal.

The processor 15 controls the X direction moving base motor 9b and the Y direction moving base motor 10b to move the chemical liquid discharging device 2 set in the mounting module 5 to a predetermined position. For example, the processor 15 moves the chemical liquid discharging device 2 to a position where the plurality of nozzles 110 is inserted into a well opening 300. The processor 15 may move the chemical liquid discharging device 2 to the predetermined position according to the discharge signal.

In a case where the chemical liquid discharging device 2 is moved to the predetermined position, the processor 15 applies a voltage for discharging the chemical liquid to the driving element 130 using the driving circuit 11.

The processor 15 transmits a signal to the driving circuit 11, and a voltage control signal is input from the driving circuit 11 to the driving element 130. In response to the application of the voltage control signal, the driving element 130 deforms the diaphragm 120 to change the volume of the pressure chamber 210. Therefore, the chemical liquid is discharged as a chemical liquid droplet from the nozzle 110 of the chemical liquid discharge array 27. As a result, the chemical liquid discharging device 2 dispenses a predetermined amount of liquid from the nozzle 110 to the well opening 300 of the microplate 4.

For dispensing the predetermined amount of liquid to each well opening 300 of the microplate 4, the processor 15 repeats an operation of transmitting a signal to the X direction moving base control circuit 9a, the Y direction moving base control circuit 10a, and the driving circuit 11.

The number of times and the position at which the processor 15 discharges the chemical liquid are not limited to a specific configuration.

In a case where it is determined that the chemical liquid discharging device 2 has not been used according to the use history, the processor 15 may transmit a signal indicating that the chemical liquid discharging device 2 has not been used to the host computer 18. The host computer 18 may display that the chemical liquid discharging device 2 has not been used on the display unit 18b or the like, based on the corresponding signal.

In a case where it is determined that the chemical liquid discharging device 2 has been used according to the use history, the processor 15 does not discharge the chemical liquid from the chemical liquid discharging device 2.

For example, the processor 15 does not discharge the chemical liquid even in a case where the processor 15 receives the discharge signal. The processor 15 transmits a signal indicating that the chemical liquid discharging device 2 has been used to the host computer 18 through the interface 17.

In a case where the host computer 18 receives the corresponding signal, the host computer 18 displays a warning or the like indicating that the chemical liquid discharging device 2 has been used on the display unit 18b or the like.

The processor 15 has a function of opening the record portion 30 (changing the shape of the record portion 30) of the chemical liquid discharging device 2 using the forming portion 20 in a case where the chemical liquid is discharged.

In a case where the discharge of the chemical liquid is completed, the processor 15 control the X direction moving base motor 9b and the Y direction moving base motor 10b so as to move the record portion 30 of the chemical liquid discharging device 2 set in the mounting module 5 to a position where the forming portion 20 is located. In a case where the record portion 30 is moved to the position where the forming portion 20 is located, the processor 15 transmits a signal for opening the record portion 30 to the forming portion control circuit 19. In a case where the forming portion control circuit 19 receives the corresponding signal, the forming portion control circuit 19 supplies electric power to the rotary solenoid 35 of the forming portion 20 to rotate the cutting blade 34. As a result, the cutting blade 34 pierces the record portion 30 and opens the record portion 30.

The processor 15 may open the record portion 30 by another method. For example, the processor 15 may open the record portion 30 using a laser or the like. The method of opening the record portion 30 by the processor 15 is not limited to a specific method.

Next, an operation example of the processor 15 of the chemical liquid dispensing apparatus 1 will be described.

Figure 9:
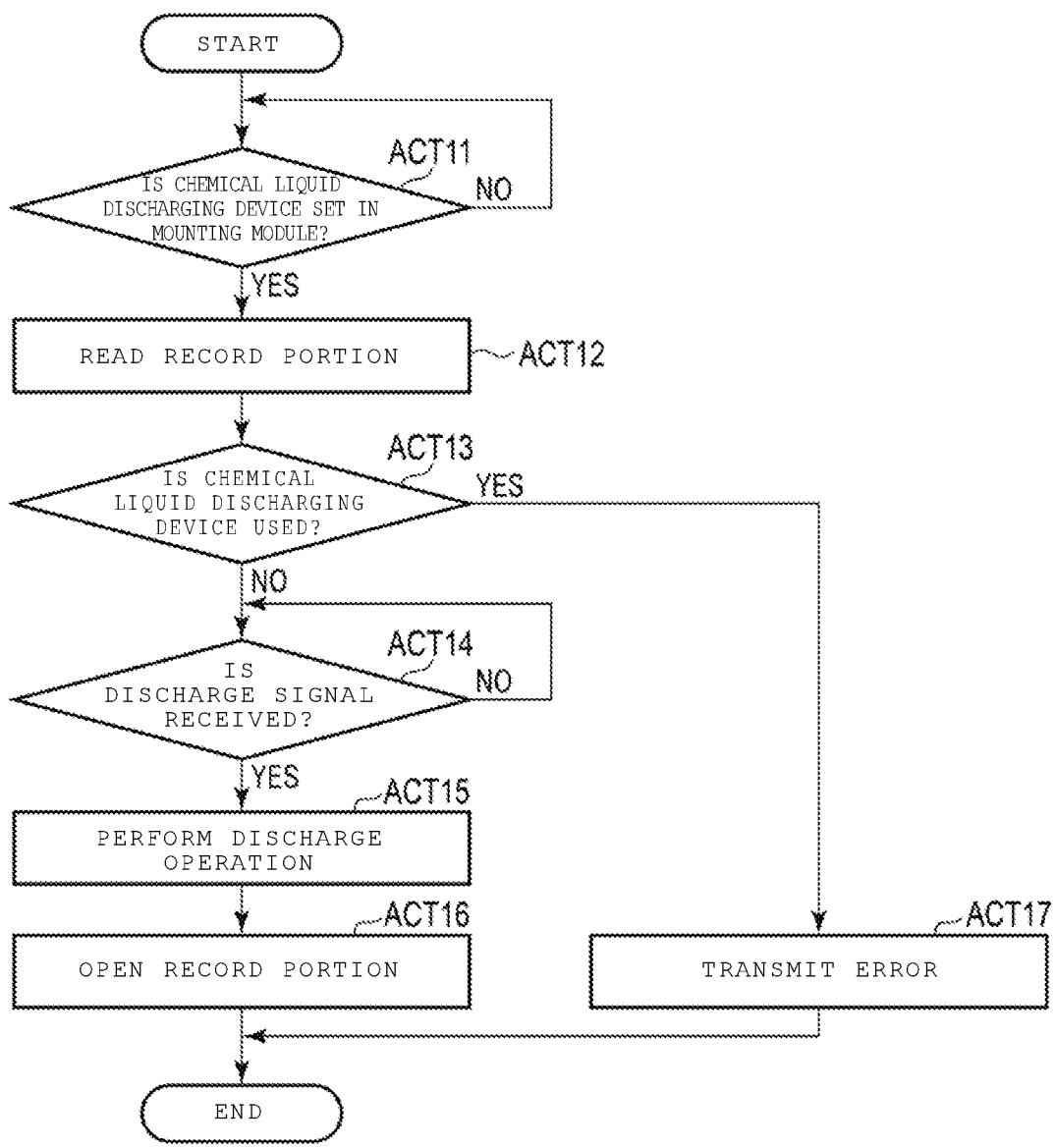
FIG. 9 is a flowchart showing an operation example of a chemical liquid dispensing apparatus according to the first embodiment.

FIG. 9 is a flowchart for describing the operation example of the processor 15 of the chemical liquid dispensing apparatus 1.

First, the processor 15 determines whether or not the chemical liquid discharging device 2 is set in the mounting module 5 (ACT11). In a case where it is determined that the chemical liquid discharging device 2 is not set in the mounting module 5 (ACT11, NO), the processor 15 returns to ACT11.

In a case where it is determined that the chemical liquid discharging device 2 is set in the mounting module 5 (ACT11, YES), the processor 15 reads the opening state as the use history from the record portion 30 (ACT12). In a case where the processor 15 reads the shape of the record portion 30, the processor 15 determines whether or not the chemical liquid discharging device 2 has been used according to the use history (ACT13).

In a case where it is determined that the chemical liquid discharging device 2 has not been used according to the use history (ACT13, NO), the processor 15 determines whether or not the discharge signal has been received through the interface 17 (ACT14). In a case where it is determined that the discharge signal has not been received through the interface 17 (ACT14, NO), the processor 15 returns to ACT14.

In a case where it is determined that the discharge signal has been received through the interface 17 (ACT14, YES), the processor 15 causes the chemical liquid discharging device 2 to discharge the chemical liquid according to the discharge signal (ACT15).

In a case where the chemical liquid discharging device 2 is caused to discharge the chemical liquid, the processor 15 opens the record portion 30 (ACT16).

In a case where it is determined that the chemical liquid discharging device 2 has been used according to the use history (ACT13, YES), the processor 15 transmits the signal indicating that the chemical liquid discharging device 2 has been used to the host computer 18 through the interface 17 (ACT17).

In a case where the record portion 30 is opened (ACT16), or in a case where the signal indicating that the chemical liquid discharging device 2 has been used transmitted to the host computer 18 (ACT17), the processor 15 ends the operation.

In the discharging system configured as described above, the record portion of the chemical liquid discharging device indicates that the record portion has been used by the opening of the record portion. The discharging system reads the record portion to recognize whether or not the chemical liquid discharging device has been used. In a case where the chemical liquid discharging device has been used, the discharging system does not discharge the chemical liquid from the chemical liquid discharging device.

In a case where the chemical liquid discharging device discharges the chemical liquid, the discharging system opens the record portion of the chemical liquid discharging device. As a result, the discharging system can prevent the discharge of the chemical liquid reusing the chemical liquid discharging device that has been used once.

Since the record portion of the used chemical liquid discharging device is opened, the discharging system can present that the chemical liquid discharging device has been used to the user.

In a case where the chemical liquid dispensing apparatus 1 causes the chemical liquid discharging device 2 to discharge the chemical liquid, the chemical liquid dispensing apparatus 1 may change a color at a predetermined position of the chemical liquid discharging device 2. For example, the chemical liquid dispensing apparatus 1 may apply ink to the predetermined position of the chemical liquid discharging device 2. The chemical liquid dispensing apparatus 1 then reads the color at the predetermined position of the chemical liquid discharging device 2 using a camera or the like to determine whether or not the chemical liquid discharging device 2 has been used.

In a case where the chemical liquid dispensing apparatus 1 causes the chemical liquid discharging device 2 to discharge the chemical liquid, the chemical liquid dispensing apparatus 1 may change a shape of a predetermined position of the chemical liquid discharging device 2. For example, the shape of the predetermined position of the chemical liquid discharging device 2 can be changed by a cutter or the like. The chemical liquid dispensing apparatus 1 reads the shape of the predetermined position of the chemical liquid discharging device 2 by a camera or the like to determine whether or not the chemical liquid discharging device 2 has been used.

The discharging system configured as described above determines whether or not the chemical liquid discharging device has been used from also the color or the shape of the predetermined position and thus the discharging system can prevent the discharge of the chemical liquid reusing the chemical liquid discharging device that has been used once. Since the color or the shape of the predetermined position of the used chemical liquid discharging device is changed, the discharging system can present that the chemical liquid discharging device has been used to the user.

Second Embodiment

The chemical liquid dispensing apparatus 1 according to Second Embodiment is different from that of First Embodiment in a point that the record portion 30 is opened in a case where the chemical liquid holding container 22 is filled with the chemical liquid. Therefore, the same reference numerals are used for the components that are substantially the same as those of First Embodiment, and the description of repeated components may be omitted.

The host computer 18 receives an operation of indicating that the chemical liquid holding container 22 is filled with the chemical liquid through the operation unit 18a. For example, in a case where the chemical liquid holding container 22 is filled with the chemical liquid, the operator inputs the operation that indicates filling of the chemical liquid to the operation unit 18a.

In a case where the host computer 18 receives the operation indicating the chemical liquid holding container 22 is filled with the chemical liquid, the host computer 18 transmits a filling signal indicating that the chemical liquid holding container 22 is filled with the chemical liquid to the chemical liquid dispensing apparatus 1 through the interface 17.

Next, a function implemented by the processor 15 of the chemical liquid dispensing apparatus 1 will be described. The following function is implemented by the processor 15 executing the program stored in the memory 16 or the like.

The processor 15 has a function of detecting that the chemical liquid holding container 22 is filled with the chemical liquid.

For example, the processor 15 determines whether or not the filling signal has been received from the host computer 18. In a case where it is determined that the filling signal has been received from the host computer 18, the processor 15 detects that the chemical liquid holding container 22 is filled with the chemical liquid.

The chemical liquid dispensing apparatus 1 or the chemical liquid discharging device 2 may include a sensor for detecting that the chemical liquid holding container 22 is filled with the chemical liquid. The processor 15 may detect that the chemical liquid holding container 22 is filled with the chemical liquid using the corresponding sensor.

A method of detecting that the chemical liquid holding container 22 is filled with the chemical liquid by the processor 15 is not limited to a specific method.

The processor 15 has a function of opening the record portion 30 of the chemical liquid discharging device 2 using the forming portion 20 in a case where the processor 15 detects that the chemical liquid holding container 22 is filled with the chemical liquid.

The operation of opening the record portion 30 of the chemical liquid discharging device 2 using the forming portion 20 by the processor 15 is the same as that of First Embodiment, and thus detailed descriptions thereof are omitted.

Next, an operation example of the processor 15 of the chemical liquid dispensing apparatus 1 will be described.

Figure 10:
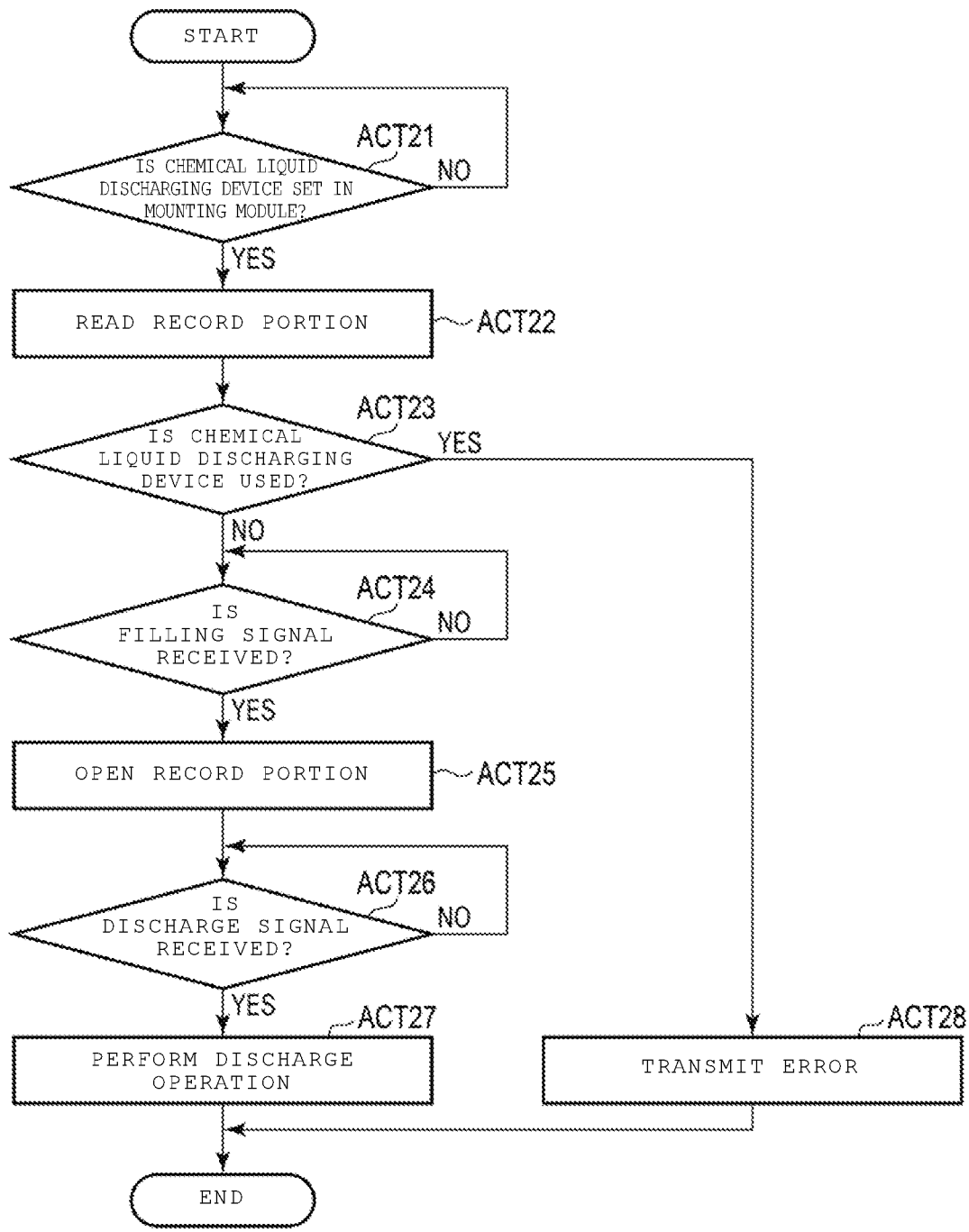
FIG. 10 is a flowchart showing an operation example of a chemical liquid dispensing apparatus according to a second embodiment.

FIG. 10 is a flowchart for describing the operation example of the processor 15 of the chemical liquid dispensing apparatus 1.

First, the processor 15 determines whether or not the chemical liquid discharging device 2 is set in the mounting module 5 (ACT21). In a case where it is determined that the chemical liquid discharging device 2 is not set in the mounting module 5 (ACT21, NO), the processor 15 returns to ACT21.

In a case where it is determined that the chemical liquid discharging device 2 is set in the mounting module 5 (ACT21, YES), the processor 15 reads the use history from the record portion 30 (ACT22). In a case where the processor 15 reads the use history from the record portion 30, the processor 15 determines whether or not the chemical liquid discharging device 2 has been used according to the use history (ACT23).

In a case where it is determined that the chemical liquid discharging device 2 has not been used according to the use history (ACT23, NO), the processor 15 determines whether or not the filling signal has been received through the interface 17 (ACT24). In a case where it is determined that the filling signal has not been received through the interface 17 (ACT24, NO), the processor 15 returns to ACT24.

In a case where it is determined that the filling signal has been received through the interface 17 (ACT24, YES), the processor 15 opens the record portion 30 (ACT25).

In a case where the record portion 30 is opened, the processor 15 determines whether or not the discharge signal has been received through the interface 17 (ACT26). In a case where it is determined that the discharge signal has not been received through the interface 17 (ACT26, NO), the processor 15 returns to ACT26.

In a case where it is determined that the discharge signal has been received through the interface 17 (ACT26, YES), the processor 15 causes the chemical liquid discharging device 2 to discharge the chemical liquid according to the discharge signal (ACT27).

In a case where it is determined that the chemical liquid discharging device 2 has been used according to the use history (ACT23, YES), the processor 15 transmits the signal indicating that the chemical liquid discharging device 2 has been used to the host computer 18 through the interface 17 (ACT28).

In a case where the chemical liquid discharging device 2 is caused to discharge the chemical liquid (ACT27), or in a case where the signal indicating that the chemical liquid discharging device 2 has been used transmitted to the host computer 18 (ACT28), the processor 15 ends the operation.

The discharging system configured as described above opens the record portion of the chemical liquid discharging device at the time when the chemical liquid holding container is filled with the chemical liquid. As a result, the discharging system opens the record portion of the chemical liquid discharging device even in a case where the operation of discharging is not performed although the operator fills the chemical liquid holding container with the chemical liquid.

Therefore, the discharging system can prevent contamination even in a case where the operation of discharging is not performed although the operator fills the chemical liquid holding container with the chemical liquid.

Third Embodiment

A chemical liquid discharging device 2a according to Third Embodiment is different from that of First Embodiment in a point that the chemical liquid discharging device 2a includes a film 38. Therefore, the same reference numerals are used for the components that are substantially the same as those of First Embodiment, and the description of repeated components may be omitted.

Figure 11:
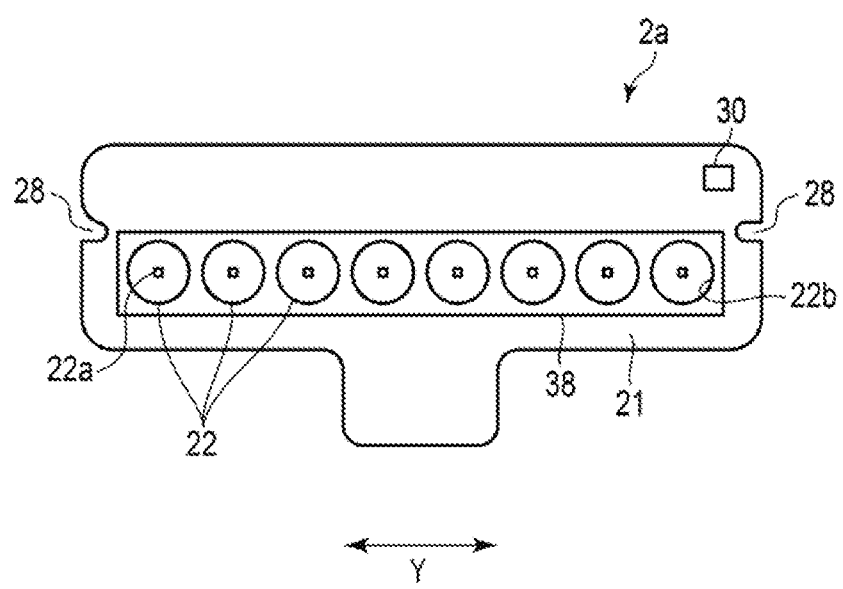
FIG. 11 is a plan view of an upper surface of a chemical liquid discharging device according to a third embodiment.

A schematic configuration of a discharging system 500a according to the third embodiment is shown in FIG. 1. FIG. 11 is a top view of the chemical liquid discharging device 2a. A bottom view of a surface from which a chemical liquid is discharged from the chemical liquid discharging device 2a is shown in FIG. 3.

As shown in FIG. 1, the discharging system 500a includes the chemical liquid discharging device 2a instead of the chemical liquid discharging device 2.

As shown in FIG. 11, the chemical liquid discharging device 2a includes the film 38 on the chemical liquid holding container 22.

The film 38 includes a sheet of a rectangular shape. For example, the film 38 includes vinyl, plastic, a predetermined resin, or the like. The film 38 may be transparent or translucent. The film 38 may be opaque.

The film 38 is formed so as to cover the chemical liquid holding container 22 from the upper surface. For example, the film 38 is adhered to the base member 21 by an adhesive or the like at an edge. The film 38 is formed so that the user easily peels off the film 38. For example, the film 38 is not adhered to the base member 21 at corners.

In a case where the user uses the chemical liquid discharging device 2, the user uses the film 38 by peeling off the film 38. For example, the user peels off the film 38 before the chemical liquid discharging device 2 is set in the chemical liquid dispensing apparatus 1, or before the chemical liquid is injected into the chemical liquid holding container 22 after the setting.

The discharging system 500a may have a characteristic of the discharging system according to Second Embodiment.

In the discharging system configured as described above, the record portion of the chemical liquid discharging device indicates that the record portion has been used by the opening of the record portion. The discharging system reads the record portion to recognize whether or not the chemical liquid discharging device has been used. In a case where the chemical liquid discharging device has been used, the discharging system does not discharge the chemical liquid from the chemical liquid discharging device.

In a case where the chemical liquid discharging device discharges the chemical liquid, the discharging system opens the record portion of the chemical liquid discharging device.

As a result, the discharging system can prevent the discharge of the chemical liquid reusing the chemical liquid discharging device that has been used once.

Since the record portion of the used chemical liquid discharging device is opened, the discharging system can present that the chemical liquid discharging device has been used to the user.

In the chemical liquid discharging device configured as described above, before the chemical liquid is injected, the film covering the chemical liquid holding container is peeled off by the user. As a result, the chemical liquid discharging device can present that the chemical liquid discharging device has been used by the absence of the film to the user.

Fourth Embodiment

A chemical liquid dispensing apparatus according to Fourth Embodiment is different from that of First Embodiment in a point that the chemical liquid dispensing apparatus according to Fourth Embodiment acquires the use history of the chemical liquid discharging device from a server. Therefore, the same reference numerals are used for the components that are substantially the same as those of First Embodiment, and the description of repeated components may be omitted.

Figure 12:
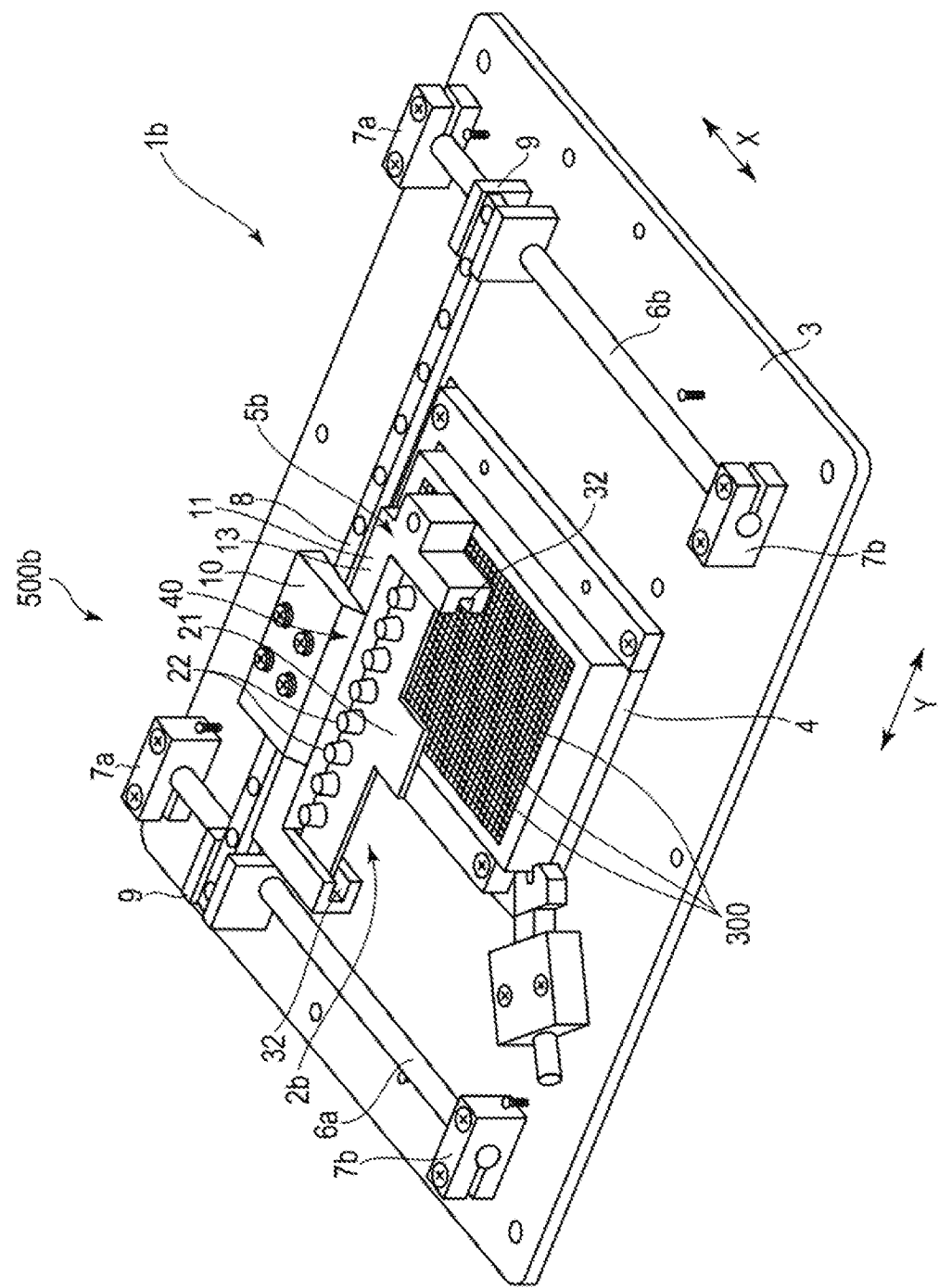
FIG. 12 is a perspective view showing a schematic configuration of a discharging system according to a fourth embodiment.
Figure 13:
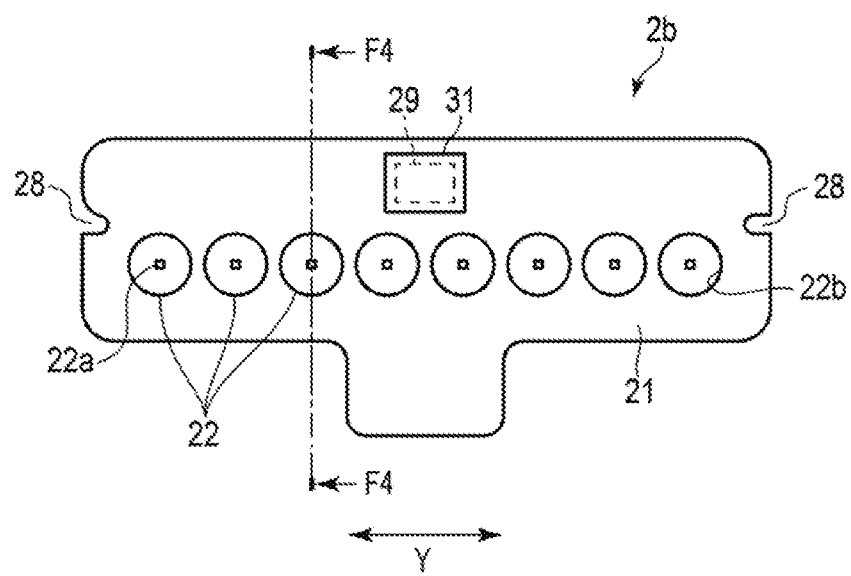
FIG. 13 is a plan view of an upper surface of a chemical liquid discharging device according to the fourth embodiment.
Figure 14:
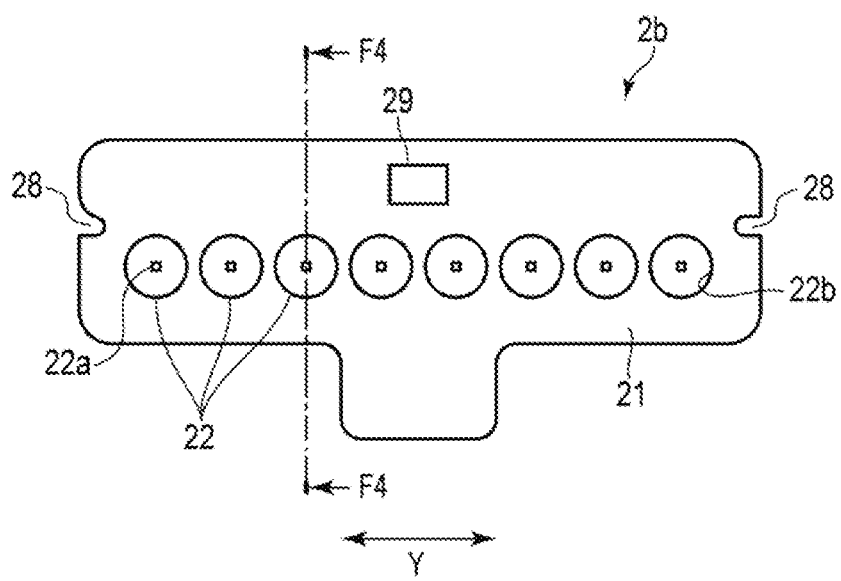
FIG. 14 is a plan view of the upper surface of the chemical liquid discharging device according to the fourth embodiment.

FIG. 12 is a perspective view showing a schematic configuration of a discharging system 500b according to the embodiment. FIG. 13 is a top view of a chemical liquid discharging device 2b. FIG. 14 is a top view of the chemical liquid discharging device 2b.

As shown in FIG. 12, the discharging system 500b includes a chemical liquid dispensing apparatus 1b, the chemical liquid discharging device 2b, a host computer 18 that will be described later, a server 50 (external device), and the like. The discharging system 500b may have more elements in addition to the elements depicted in FIG. 12, or some of the elements depicted in FIG. 12 may be omitted in some embodiments.

A mounting module 5b is mounted on the Y direction moving base 10. The chemical liquid discharging device 2b is fixed to the mounting module 5b.

The mounting module 5b includes a reader 40 (acquisition unit) and the like.

The reader 40 is a reading unit that reads a code 29 of the chemical liquid discharging device 2b. The reader 40 images and decodes the code 29. The reader 40 transmits a decode result to the processor 15.

For example, the reader 40 includes an imaging unit such as a CCD. The reader 40 may include a light or the like that illuminates the code 29.

The reader 40 is installed at a position corresponding to the position of the code 29 of the chemical liquid discharging device 2b. That is, the reader 40 is installed at a position where the code 29 may be read in a case where the chemical liquid discharging device 2b is set in the mounting module 5b.

As shown in FIG. 13, the chemical liquid discharging device 2b includes the code 29 and a film 31 on the base member 21.

The code 29 (also referred to as a presentation unit) indicates an identifier (also referred to as identification information) for specifying the chemical liquid discharging device 2b. For example, the code 29 is generated by encoding a character string, a numerical value, or a combination thereof as the identifier. That is, the code 29 indicates the identifier for specifying the chemical liquid discharging device 2b in a case where the code 29 is decoded. The code 29 is a one-dimensional code, a two-dimensional code, or the like.

The code 29 is given to the chemical liquid discharging device 2b in advance at the time of manufacturing the chemical liquid discharging device 2b or the like.

The film 31 prevents the reader 40 from reading the code 29. The film 31 includes a sheet of a rectangular shape. For example, the film 31 includes vinyl, plastic, a predetermined resin, or the like. The film 31 may be transparent or translucent. The film 31 may be opaque.

The film 31 is formed so as to cover the code 29 from the upper surface. For example, the film 31 is adhered to the base member 21 by an adhesive or the like at an edge. The film 31 is formed so that the user easily peels off the film 31. For example, the film 31 is not adhered to the base member 21 at corners.

In a case where the user uses the chemical liquid discharging device 2b, the user uses the film 31 by peeling off the film 31. For example, the user peels off the film 31 before the chemical liquid discharging device 2b is set in the chemical liquid dispensing apparatus 1b.

FIG. 14 is top view of the chemical liquid discharging device 2b from which the film 31 is peeled off. As shown in FIG. 14, the code 29 is exposed. The code 29 is exposed, and thus the reader 40 may read the code 29.

Next, a control system of the discharging system 500b will be described.

Figure 15:
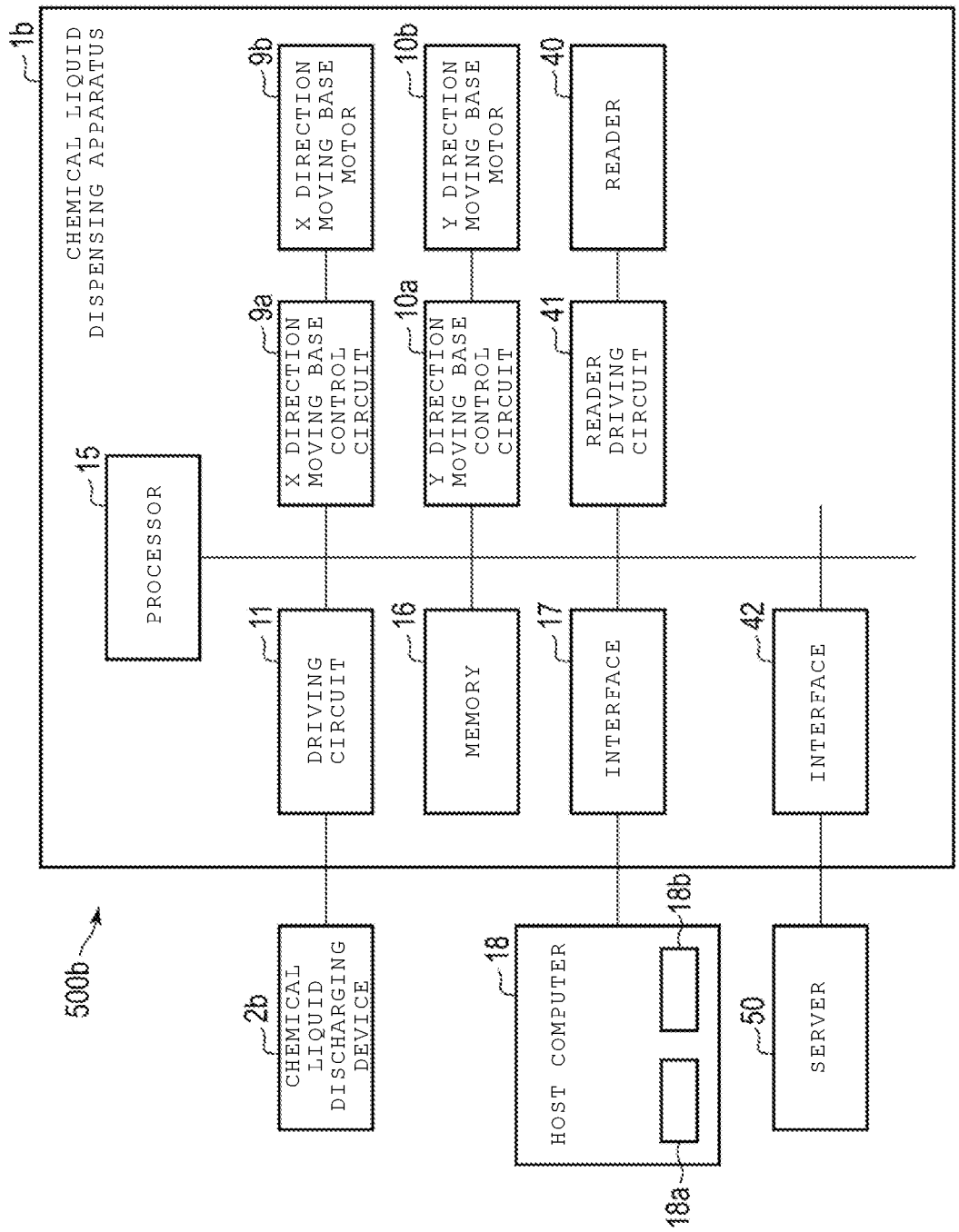
FIG. 15 is a block diagram of a control system of the discharging system according to the fourth embodiment.

FIG. 15 is a block diagram showing the control system of the discharging system 500b.

As shown in FIG. 15, the discharging system 500b includes the chemical liquid dispensing apparatus 1b, the chemical liquid discharging device 2b, the host computer 18, the server 50, and the like.

As shown in FIG. 15, the chemical liquid dispensing apparatus 1b includes the X direction moving base control circuit 9a, the X direction moving base motor 9b, the Y direction moving base control circuit 10a, the Y direction moving base motor 10b, the driving circuit 11, the processor 15, the memory 16, the interface 17, the reader 40, a reader driving circuit 41, an interface 42, and the like. Such units are connected to each other through a data bus. The chemical liquid dispensing apparatus 1b may have more elements in addition to the elements depicted in FIG. 15, or some of the elements depicted in FIG. 15 may be omitted in some embodiments.

The interface 42 is an interface for transmitting and receiving data to and from the server 50. For example, the interface 42 is connected to the server 50 through a wired or wireless line. For example, the interface 42 may support a LAN connection, a USB connection, or a Bluetooth connection.

The interfaces 17 and 42 may be integrally formed.

The reader driving circuit 41 drives the reader 40 according to a signal from the processor 15. For example, the reader driving circuit 41 supplies electric power to the reader 40. The reader driving circuit 41 transmits data output from the reader 40 to the processor 15.

Next, the server 50 will be described.

Figure 16:
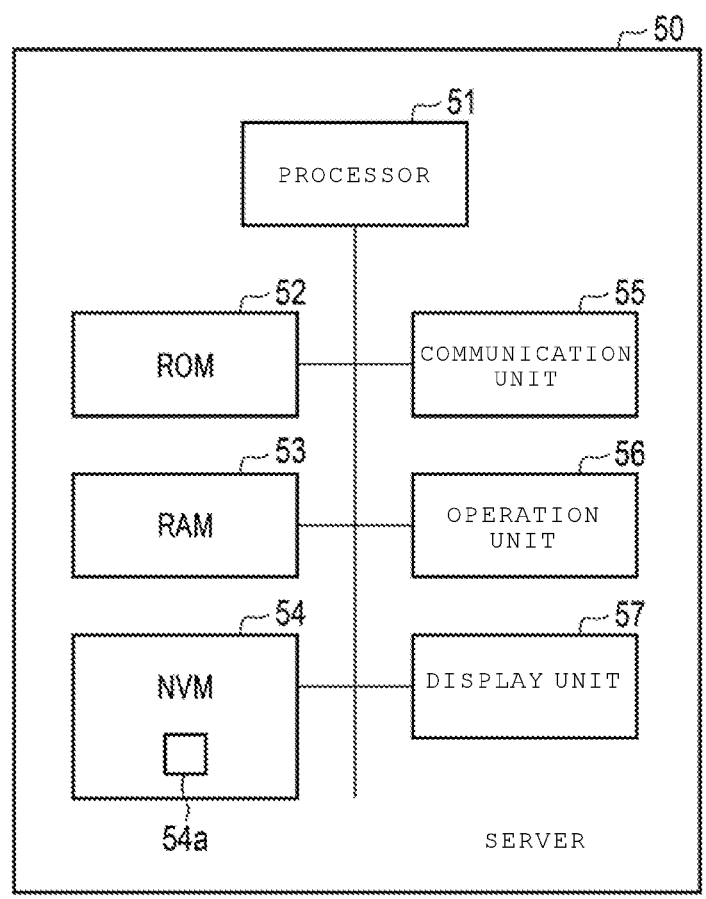
FIG. 16 is a block diagram of a configuration example of a server according to the fourth embodiment.

FIG. 16 shows a configuration example of the server 50. In the configuration example shown in FIG. 16, the server 50 includes a processor 51, a ROM 52, a RAM 53, an NVM 54, a communication unit 55, an operation unit 56, a display unit 57, and the like. Such units are connected to each other through a data bus. The server 50 may have more elements in addition to the elements depicted in FIG. 16, or some of the elements depicted in FIG. 16 may be omitted in some embodiments.

The processor 51 has a function of controlling an operation of the whole server 50. The processor 51 may include an internal cache, various interfaces, and the like. The processor 51 enables various processes by executing a program stored in the internal cache, the ROM 52, or the NVM 54 in advance.

Some of the various functions achieved by the execution of the program by the processor 51 may be implemented by a hardware circuit. In this case, the processor 51 controls a function executed by the hardware circuit.

The ROM 52 is a nonvolatile memory in which a control program, control data, and the like are stored in advance. The control program and the control data stored in the ROM 52 are incorporated in advance according to a specification of the server 50. For example, the ROM 52 stores a program (for example, BIOS) for controlling a circuit board of the server 50.

The RAM 53 is a volatile memory. The RAM 53 temporarily stores data or the like under processing of the processor 51. The RAM 53 stores various application programs based on an instruction from the processor 51. The RAM 53 may store data necessary for executing the application program, an execution result of the application program, and the like.

The NVM 54 is a nonvolatile memory capable of writing and rewriting data. For example, the NVM 54 includes a Hard Disk Drive (HDD), a Solid State Drive (SSD), an EEPROM (registered trademark), a flash memory, or the like. The NVM 54 stores a control program, an application, various data, and the like according to an operation purpose of the server 50.

The NVM 54 includes a storage area 54a that stores the use history. The use history will be described in detail later.

The communication unit 55 is an interface for transmitting and receiving data to and from the chemical liquid dispensing apparatus 1b. For example, the communication unit 55 is connected to the chemical liquid dispensing apparatus 1b through a wired or wireless line. For example, the communication unit 55 may support a LAN connection, a USB connection, or a Bluetooth connection.

The operation unit 56 receives an input of the various operations of the operator. The operation unit 56 transmits a signal indicating the received operation to the processor 51. For example, the operation unit 56 includes a keyboard, a ten key, and a touch panel.

The display unit 57 displays various kinds of information by a control of the processor 51. For example, the display unit 57 includes a liquid crystal monitor. In a case where the operation unit 56 includes a touch panel or the like, the display unit 57 may be integrated with the operation unit 56.

Next, the use history stored in the storage area 54a will be described.

The storage area 54a stores the use history for each chemical liquid discharging device 2b. For example, the storage area 54a stores an identifier obtained by decoding the code 29 and the use history by mapping the identifier and the use history.

The use history indicates whether or not the corresponding chemical liquid discharging device 2b has been used. For example, the use history indicates whether or not the chemical liquid is discharged from the chemical liquid discharging device 2b. In a case where the chemical liquid discharging device 2b discharges the chemical liquid once (from at least one chemical liquid holding container 22), the use history indicates that the chemical liquid discharging device 2b has been used.

For example, the use history is a bit or the like indicating whether or not the chemical liquid discharging device 2b has been used. For example, in a case of "0", the use history indicates that the chemical liquid discharging device 2b has not been used. In a case of "1", the use history indicates that the chemical liquid discharging device 2b has been used.

For example, the use history is input by the operator through the operation unit 56. For example, the operator stores the use history corresponding to the chemical liquid dispensing apparatus 1b set in the chemical liquid dispensing apparatus 1b in the storage area 54a through the operation unit 56 or the like. The use history indicates that the corresponding chemical liquid discharging device 2b has not been used in an initial state.

Next, a function implemented by the processor 51 of the server 50 will be described. The following function is implemented by the processor 51 executing the program stored in the NVM 54 or the like.

First, the processor 51 has a function of transmitting the use history to the chemical liquid dispensing apparatus 1b through the communication unit 55.

For example, the processor 51 receives an acquisition request to acquire a use history corresponding to a predetermined chemical liquid discharging device 2b through the communication unit 55. For example, the acquisition request includes an identifier for specifying the chemical liquid discharging device 2b. In a case where the processor 51 receives the acquisition request, the processor 51 acquires the use history corresponding to the corresponding chemical liquid discharging device 2b from the storage area 54a. For example, the processor 51 acquires the use history corresponding to the identifier included in the acquisition request. In a case where the processor 51 acquires the use history, the processor 51 transmits a response including the use history to the chemical liquid dispensing apparatus 1b through the communication unit 55.

The processor 51 has a function of rewriting the use history according to an update request from the chemical liquid dispensing apparatus 1b.

For example, the processor 51 receives the update request instructing a store of information indicating that a predetermined chemical liquid discharging device 2b has been used as the use history corresponding to the predetermined chemical liquid discharging device 2b from the chemical liquid dispensing apparatus 1b through the communication unit 55. In a case where the processor 51 receives the update request, the processor 51 stores (that is, overwrites) the information (for example, bit) indicating that the chemical liquid discharging device 2b has been used as the use history corresponding to the corresponding chemical liquid discharging device 2b in the storage area 54a. For example, the processor 51 stores the information indicating that the chemical liquid discharging device 2b has been used as the use history corresponding to the identifier included in the update request in the storage area 54a.

In a case where the processor 51 stores the information indicating that the chemical liquid discharging device 2b has been used in the storage area 54a, the processor 51 transmits a response indicating that the rewriting is successful to the chemical liquid dispensing apparatus 1b through the communication unit 55.

In a case where the processor 51 stores the information indicating that the chemical liquid discharging device 2b has been used as the use history, the processor 51 may lock the rewriting of the corresponding use history.

Next, the function implemented by the processor 15 of the chemical liquid dispensing apparatus 1b will be described. The following function is implemented by the processor 15 executing the program stored in the memory 16 or the like.

First, the processor 15 has a function of acquiring the identifier for specifying the chemical liquid discharging device 2b from the chemical liquid discharging device 2b.

The processor 15 determines whether or not the chemical liquid discharging device 2b is set in the mounting module 5b. For example, the processor 15 determines whether or not the chemical liquid discharging device 2b is set in the mounting module 5b according to a signal from a sensor that is not shown in the drawing.

In a case where it is determined that the chemical liquid discharging device 2b is set in the mounting module 5b, the processor 15 reads the code 29 of the chemical liquid discharging device 2b through the reader 40. For example, the reader 40 reads and decodes the code 29. The reader 40 transmits the decode result to the processor 15. The processor 15 acquires the identifier indicating the chemical liquid discharging device 2b as the decode result from the reader 40. The processor 15 may decode the code 29.

The processor 15 has a function of acquiring the use history corresponding to the chemical liquid discharging device 2b specified by the acquired identifier from the server 50.

The processor 15 generates the acquisition request for acquiring the use history corresponding to the corresponding chemical liquid discharging device 2b. For example, the processor 15 stores the obtained identifier in the acquisition request. In a case where the processor 15 generates the acquisition request, the processor 15 transmits the acquisition request to the server 50 through the interface 42.

The processor 15 receives a response including the use history corresponding to the corresponding chemical liquid discharging device 2b that is specified by the identifier as a response to the acquisition request from the server 50.

The processor 15 has a function of discharging the chemical liquid from the chemical liquid discharging device 2b based on the acquired use history.

In a case where it is determined that the chemical liquid discharging device 2b has not been used according to the acquired use history, the processor 15 discharges the chemical liquid from the chemical liquid discharging device 2b.

The operation of causing the chemical liquid discharging device 2b to discharge the chemical liquid by the processor 15 is the same as that of First Embodiment, and thus descriptions thereof are omitted.

In a case where it is determined that the chemical liquid discharging device 2b has been used according to the acquired use history, the processor 15 does not discharge the chemical liquid from the chemical liquid discharging device 2b.

For example, in a case where it is determined that the chemical liquid discharging device 2b has been used according to the acquired use history, the processor 15 does not discharge the chemical liquid even though the processor 15 receives the discharge signal. The processor 15 transmits a signal indicating that the chemical liquid discharging device 2b has been used to the host computer 18 through the interface 17.

In a case where the host computer 18 receives the corresponding signal, the host computer 18 displays a warning or the like indicating that the chemical liquid discharging device 2b has been used on the display unit 18b or the like.

In a case where the processor 15 does not read the identifier through the reader 40, the processor 15 does not discharge the chemical liquid from the chemical liquid discharging device 2b. That is, in a case where the processor 15 does not read the identifier through the reader 40, the processor 15 does not discharge the chemical liquid even though the processor 15 receives the discharge signal.

The processor 15 has a function of transmitting the update request for storing the information indicating that the chemical liquid discharging device 2b has been used as the use history corresponding to the corresponding chemical liquid discharging device 2b in the server 50 in a case where the processor 15 discharges the chemical liquid.

In a case where the discharge of the chemical liquid is completed, the processor 15 generates the update request instructing a store of the information indicating that the chemical liquid discharging device 2b has been used as the use history corresponding to the corresponding chemical liquid discharging device 2b. For example, the processor 15 stores the acquired identifier in the update request. In a case where the processor 15 generates the update request, the processor 15 transmits the generated update request to the server 50 through the interface 42.

The processor 15 receives a response indicating that the rewriting is completed from the server 50 through the interface 42. In a case where the processor 15 receives a response indicating that the rewriting is failed or in a case where the processor 15 does not receive the response, the processor 15 may transmit the generated update request to the server 50 again.

Next, an operation example of the processor 15 of the chemical liquid dispensing apparatus 1b will be described.

Figure 17:
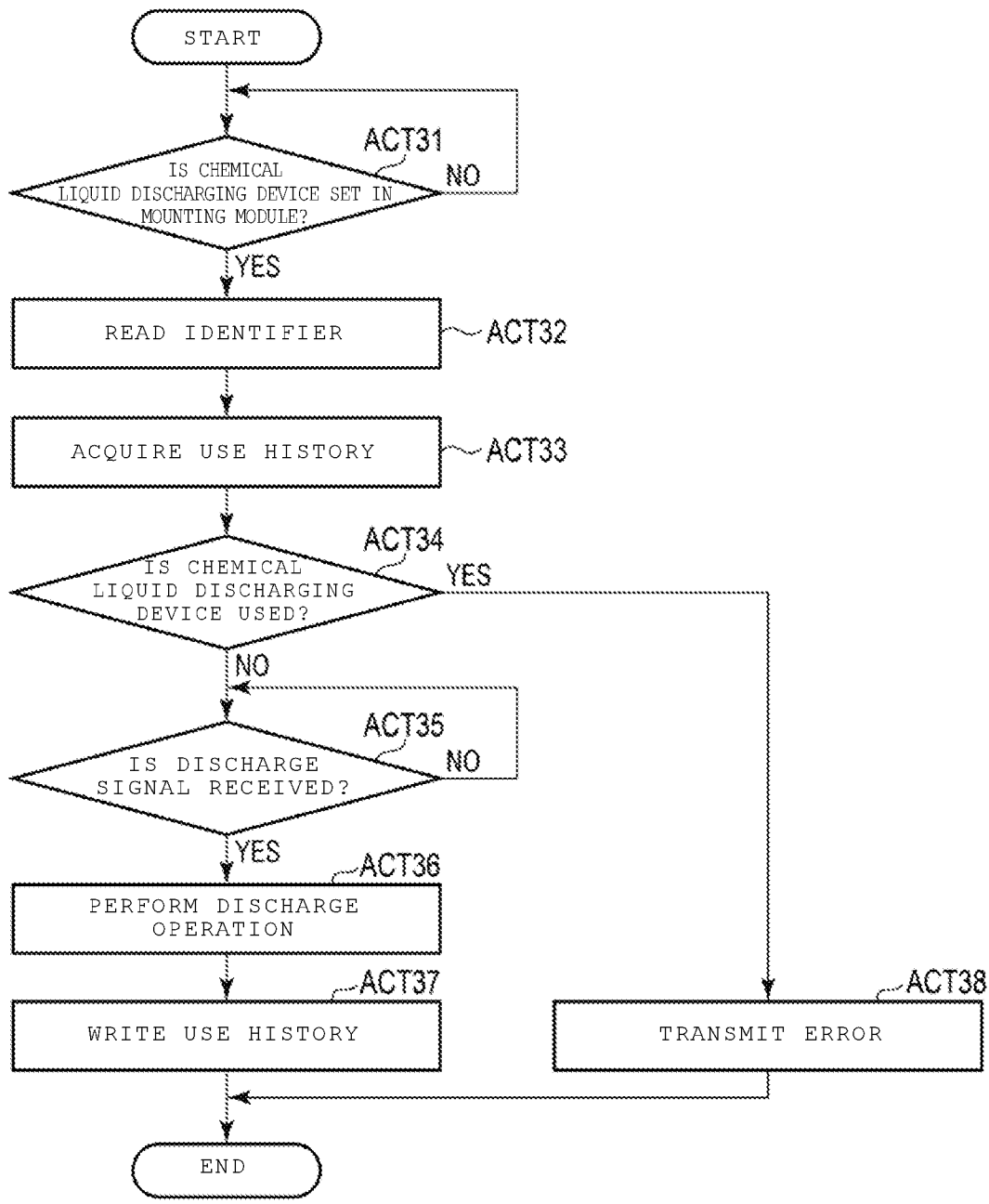
FIG. 17 is a flowchart showing an operation example of a chemical liquid dispensing apparatus according to the fourth embodiment.

FIG. 17 is a flowchart for describing the operation example of the processor 15 of the chemical liquid dispensing apparatus 1b.

First, the processor 15 determines whether or not the chemical liquid discharging device 2b is set in the mounting module 5b (ACT31). In a case where it is determined that the chemical liquid discharging device 2b is not set in the mounting module 5b (ACT31, NO), the processor 15 returns to ACT31.

In a case where it is determined that the chemical liquid discharging device 2b is set in the mounting module 5b (ACT31, YES), the processor 15 reads the identifier from the code 29 of the chemical liquid discharging device 2b (ACT32). In a case where the processor 15 reads the identifier, the processor 15 acquires the use history corresponding to the chemical liquid discharging device 2b specified by the identifier from the server 50 (ACT33).

In a case where the processor 15 acquires the use history, the processor 15 determines whether or not the chemical liquid discharging device 2b has been used according to the use history (ACT34).

In a case where it is determined that the chemical liquid discharging device 2b has not been used according to the use history (ACT34, NO), the processor 15 determines whether or not the discharge signal has been received through the interface 17 (ACT35). In a case where it is determined that the discharge signal has not been received through the interface 17 (ACT35, NO), the processor 15 returns to ACT35.

In a case where it is determined that the discharge signal has been received through the interface 17 (ACT35, YES), the processor 15 causes the chemical liquid discharging device 2*b* to discharge the chemical liquid according to the discharge signal (ACT36).

In a case where the chemical liquid discharging device 2*b* is caused to discharge the chemical liquid, the processor 15 transmits the update request instructing for a store of the information indicating that the chemical liquid discharging device 2*b* has been used as the use history corresponding to the corresponding chemical liquid discharging device 2*b* in the server 50 (ACT37).

In a case where it is determined that the chemical liquid discharging device 2*b* has been used according to the use history (ACT34, YES), the processor 15 transmits the signal indicating that the chemical liquid discharging device 2*b* has been used to the host computer 18 through the interface 17 (ACT38).

In a case where the information indicating that the chemical liquid discharging device 2*b* has been used as the use history is stored in the server 50 (ACT37), or in a case where the signal indicating that the chemical liquid discharging device 2*b* has been used transmitted to the host computer 18 (ACT38), the processor 15 ends the operation.

The chemical liquid discharging device 2*b* may include an IC module or a Radio Frequency Identifier (RFID) storing the identifier. In this case, the chemical liquid dispensing apparatus 1*b* includes a reader that reads the identifier from the IC module or the RFID. The processor 15 of the chemical liquid dispensing apparatus 1*b* acquires the identifier from the ID module or the RFID.

The chemical liquid discharging device 2*b* may include a character string indicating the identifier. In this case, the chemical liquid dispensing apparatus 1*b* includes a camera or the like that images the character string. The processor 15 of the chemical liquid dispensing apparatus 1*b* performs an Optical Character Recognition (OCR) process or the like with respect to an image obtained by capturing the character string to acquire the identifier.

The chemical liquid discharging device 2*b* may indicate the identifier by the shape of the base member 21 or the like. In this case, the processor 15 of the chemical liquid dispensing apparatus 1*b* may acquire the identifier using an image obtained by capturing the shape.

The host computer 18 and the server 50 may be integrated. For example, the host computer 18 may have a function of the server 50.

The storage area 54*a* of the server 50 may store the use history of each chemical liquid holding container 22 of the chemical liquid discharging device 2*b*. That is, the storage area 54*a* stores information indicating whether or not the chemical liquid holding container 22 has been used for each chemical liquid holding container 22 of the chemical liquid discharging device 2*b*.

For example, the processor 15 acquires the use history of each chemical liquid holding container 22 of the chemical liquid discharging device 2*b* specified by the identifier from the server 50. In a case where the processor 15 acquires the use history, the processor 15 receives the discharge signal from the host computer 18. In a case where the discharge signal has been received, the processor 15 determines whether or not the corresponding chemical liquid holding container 22 has been used according to the use history corresponding to the chemical liquid holding container 22 that discharges the chemical liquid by the discharge signal. In a case where it is determined that the chemical liquid holding container 22 has not been used according to the use history, the processor 15 discharges the chemical liquid from the chemical liquid holding container 22 according to the discharge signal. In a case where the discharge operation is completed, the processor 15 transmits an update request for rewriting that the chemical liquid holding container 22 has been used as the use history corresponding to the corresponding chemical liquid holding container 22 of the corresponding chemical liquid discharging device 2*b* to the server 50.

In a case where it is determined that the corresponding chemical liquid holding container 22 has been used according to the use history, the processor 15 does not perform the discharge operation even though the processor 15 receives the discharge signal. In this case, the processor 15 may transmit a signal indicating that the corresponding chemical liquid holding container 22 has been used to the host computer 18.

The discharging system configured as described above acquires the identifier from the chemical liquid discharging device. The discharging system acquires the use history corresponding to the chemical liquid discharging device indicated by the identifier from the server. The discharging system checks the use history in a case where the chemical liquid is discharged from the chemical liquid discharging device. In a case where it is determined that the chemical liquid discharging device has been used according to the use history, the discharging system does not discharge the chemical liquid from the chemical liquid discharging device.

In a case where the chemical liquid discharging device discharges the chemical liquid, the discharging system stores the information indicating that the chemical liquid discharging device has been used as the use history corresponding to the corresponding chemical liquid discharging device in the server.

As a result, the discharging system can prevent the discharge of the chemical liquid reusing the chemical liquid discharging device that has been used once.

In the chemical liquid discharging device configured as described above, before the chemical liquid discharging device is set in the chemical liquid dispensing apparatus, the film covering the code is peeled off by the user. As a result, the chemical liquid discharging device can present that the chemical liquid discharging device has been used by the absence of the film to the user.

Fifth Embodiment

A chemical liquid dispensing apparatus 1*b* according to Fifth Embodiment is different from that of Fourth Embodiment in a point that the chemical liquid dispensing apparatus 1*b* according to Fifth Embodiment transmits an update request for storing information indicating that the chemical liquid discharging device 2*b* has been used as the use history corresponding to the corresponding chemical liquid discharging device 2*b* in a case where the chemical liquid holding container 22 is filled with the chemical liquid. Therefore, the same reference numerals are used for the components that are substantially the same as those of Fourth Embodiment, and the description of repeated components may be omitted.

The host computer 18 receives an operation of indicating that the chemical liquid holding container 22 is filled with the chemical liquid through the operation unit 18*a*. For example, in a case where the chemical liquid holding container 22 is filled with the chemical liquid, the operator inputs the operation that indicates filling of the chemical liquid to the operation unit 18a.

Ina case where the host computer 18 receives the operation indicating that the chemical liquid holding container 22 is filled with the chemical liquid, the host computer 18 transmits a filling signal indicating that the chemical liquid holding container 22 is filled with the chemical liquid to the chemical liquid dispensing apparatus 1b through the interface 17.

Next, a function implemented by the processor 15 of the chemical liquid dispensing apparatus 1b will be described. The following function is implemented by the processor 15 executing the program stored in the memory 16 or the like.

The processor 15 has a function of detecting that the chemical liquid holding container 22 is filled with the chemical liquid.

For example, the processor 15 determines whether or not the filling signal has been received from the host computer 18. In a case where it is determined that the filling signal has been received from the host computer 18, the processor 15 detects that the chemical liquid holding container 22 is filled with the chemical liquid.

The chemical liquid dispensing apparatus 1b or the chemical liquid discharging device 2b may include a sensor for detecting that the chemical liquid holding container 22 is filled with the chemical liquid. The processor 15 may detect that the chemical liquid holding container 22 is filled with the chemical liquid using the corresponding sensor.

A method of detecting that the chemical liquid holding container 22 is filled with the chemical liquid by the processor 15 is not limited to a specific method.

The processor 15 has a function of transmitting the update request for storing the information indicating that the chemical liquid discharging device 2b has been used as the use history corresponding to the corresponding chemical liquid discharging device 2b in a case where the processor 15 detects that the chemical liquid holding container 22 is filled with the chemical liquid.

The operation of transmitting the update request for storing the information indicating that the chemical liquid discharging device 2b has been used as the use history in the server 50 by the processor 15 is the same as that of Fourth Embodiment, and thus detailed descriptions thereof are omitted.

Next, an operation example of the processor 15 of the chemical liquid dispensing apparatus 1b will be described.

Figure 18:
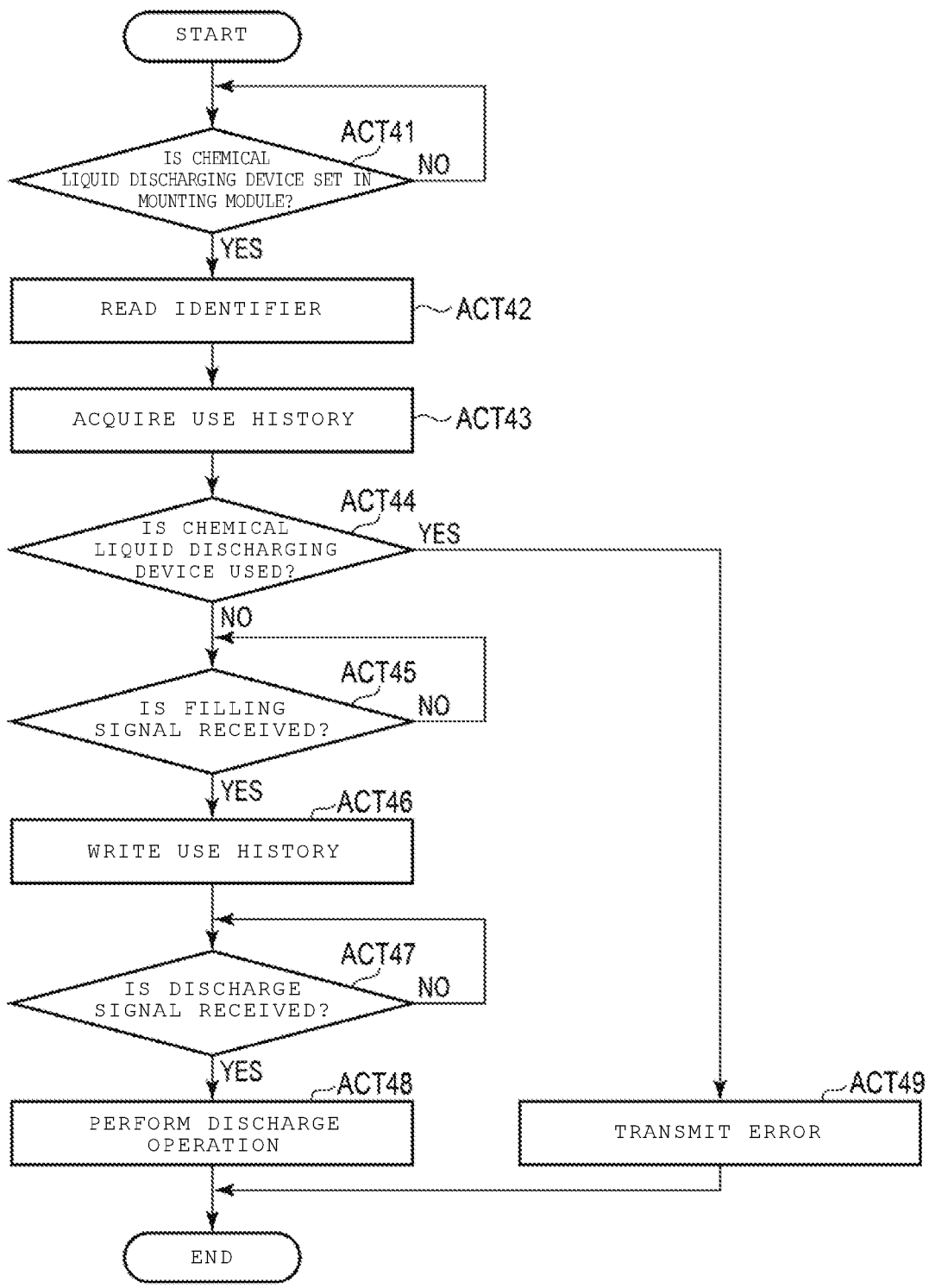
FIG. 18 is a flowchart showing an operation example of a chemical liquid dispensing apparatus according to a fifth embodiment.

FIG. 18 is a flowchart for describing the operation example of the processor 15 of the chemical liquid dispensing apparatus 1b.

First, the processor 15 determines whether or not the chemical liquid discharging device 2b is set in the mounting module 5 (ACT41). In a case where it is determined that the chemical liquid discharging device 2b is not set in the mounting module 5 (ACT41, NO), the processor 15 returns to ACT41.

In a case where it is determined that the chemical liquid discharging device 2b is set in the mounting module 5 (ACT41, YES), the processor 15 reads the identifier from the code 29 of the chemical liquid discharging device 2b (ACT42). In a case where the processor 15 reads the identifier, the processor 15 acquires the use history corresponding to the chemical liquid discharging device 2b specified by the identifier from the server 50 (ACT43).

In a case where the processor 15 acquires the use history, the processor 15 determines whether or not the chemical liquid discharging device 2b has been used according to the use history (ACT44).

In a case where it is determined that the chemical liquid discharging device 2b has not been used according to the use history (ACT44, NO), the processor 15 determines whether or not the filling signal has been received through the interface 17 (ACT45). In a case where it is determined that the filling signal has not been received through the interface 17 (ACT45, NO), the processor 15 returns to ACT45.

In a case where it is determined that the filling signal has been received through the interface 17 (ACT45, YES), the processor 15 transmits the update request for instructing the store of the information indicating that the chemical liquid discharging device 2b has been used as the use history corresponding to the corresponding chemical liquid discharging device 2b (ACT46).

In a case where the update request for instructing the store of the information indicating that the chemical liquid discharging device 2b has been used as the use history corresponding to the corresponding chemical liquid discharging device 2b is transmitted, the processor 15 determines whether or not the discharge signal has been received through the interface 17 (ACT47). In a case where it is determined that the discharge signal has not been received through the interface 17 (ACT47, NO), the processor 15 returns to ACT47.

In a case where it is determined that the discharge signal has been received through the interface 17 (ACT47, YES), the processor 15 causes the chemical liquid discharging device 2b to discharge the chemical liquid according to the discharge signal (ACT48).

In a case where it is determined that the chemical liquid discharging device 2b has been used according to the use history (ACT44, YES), the processor 15 transmits the signal indicating that the chemical liquid discharging device 2b has been used to the host computer 18 through the interface 17 (ACT49).

In a case where the chemical liquid discharging device 2b is caused to discharge the chemical liquid (ACT48), or in a case where the signal indicating that the chemical liquid discharging device 2b has been used is transmitted to the host computer 18 (ACT49), the processor 15 ends the operation.

Similarly to Fourth Embodiment, the storage area 54a of the server 50 may store the use history of each chemical liquid holding container 22 of the chemical liquid discharging device 2b. That is, the storage area 54a stores information indicating whether or not the chemical liquid holding container 22 has been used for each chemical liquid holding container 22 of the chemical liquid discharging device 2b.

For example, the processor 15 acquires the use history of each chemical liquid holding container 22 of the chemical liquid discharging device 2b specified by the identifier from the server 50. In a case where the processor 15 acquires the use history, the processor 15 receives the filling signal from the host computer 18. In a case where the processor 15 receives the filling signal, the processor 15 determines whether or not the corresponding chemical liquid holding container 22 has been used according to the use history corresponding to the chemical liquid holding container 22 filled with the chemical liquid that is indicated by the filling signal. In a case where it is determined that the chemical liquid holding container 22 has not been used according to the use history, the processor 15 transmits an update request for rewriting that the chemical liquid holding container 22 has been used as the use history corresponding to the corresponding chemical liquid holding container 22 to the server 50.

In a case where it is determined that the corresponding chemical liquid holding container 22 has been used according to the use history, the processor 15 does not perform the discharge operation even though the processor 15 receives the discharge signal. In this case, the processor 15 may transmit a signal indicating that the corresponding chemical liquid holding container 22 has been used to the host computer 18.

The discharging system configured as described above transmits the update request for instructing the store of the information indicating that the chemical liquid discharging device has been used as the use history to the server at the time when the chemical liquid holding container is filled with the chemical liquid. As a result, the discharging system can store the information indicating that the chemical liquid discharging device has been used in the server even in a case where the discharge operation of the chemical liquid is not performed from the chemical liquid holding container filled with the chemical liquid.

Therefore, the discharging system can prevent contamination even in a case where the discharge operation of the chemical liquid is not performed from the chemical liquid holding container filled with the chemical liquid.

Sixth Embodiment

A discharging system according to Sixth Embodiment is different from that of First embodiment in a point that it is determined whether or not the chemical liquid discharging device has been used according to a color of a heat sensitive sheet. Therefore, the same reference numerals are used for the components that are substantially the same as those of First Embodiment, and the description of repeated components may be omitted.

Figure 19:
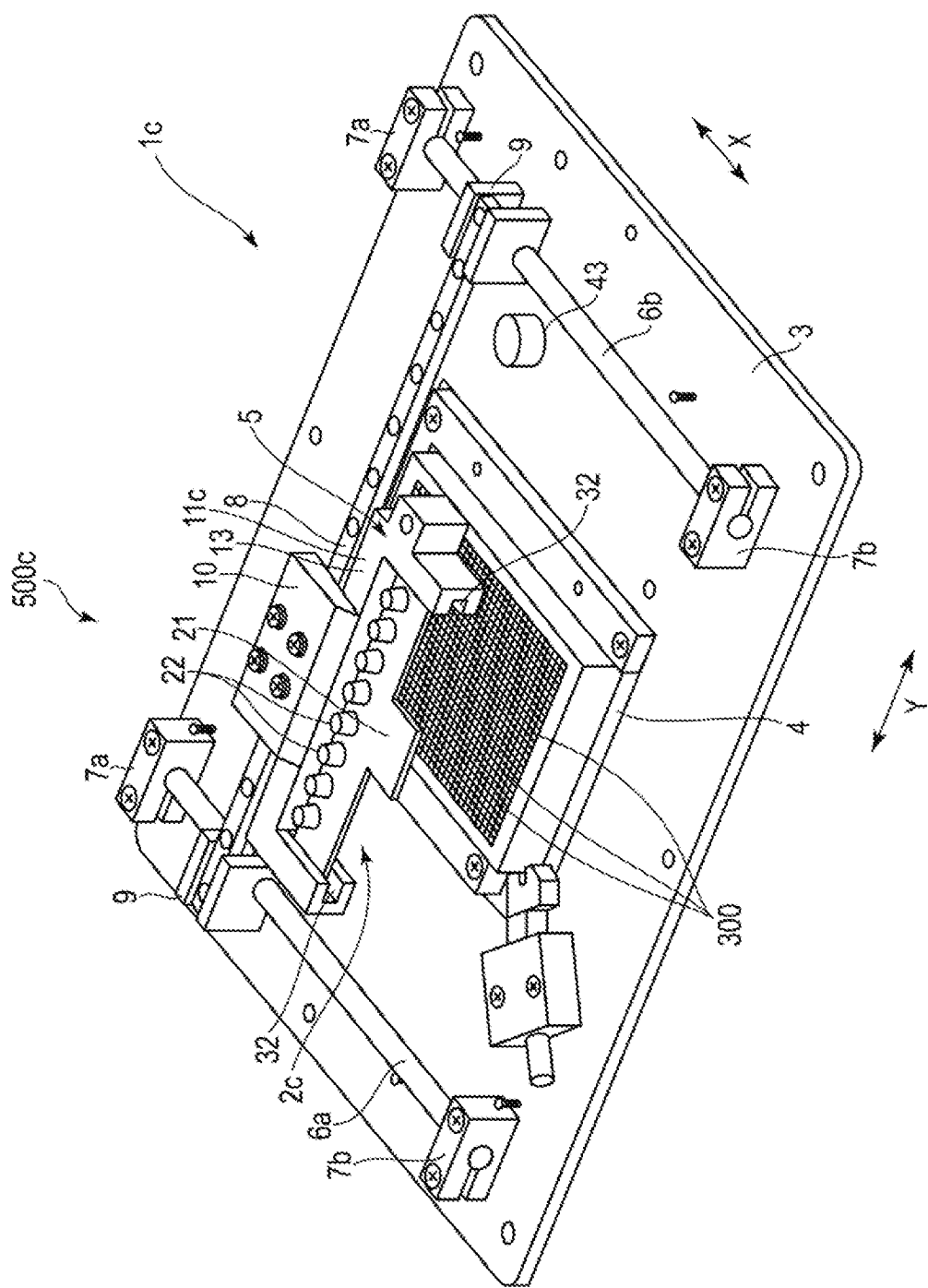
FIG. 19 is a perspective view showing a schematic configuration of a discharging system according to a sixth embodiment.
Figure 20:
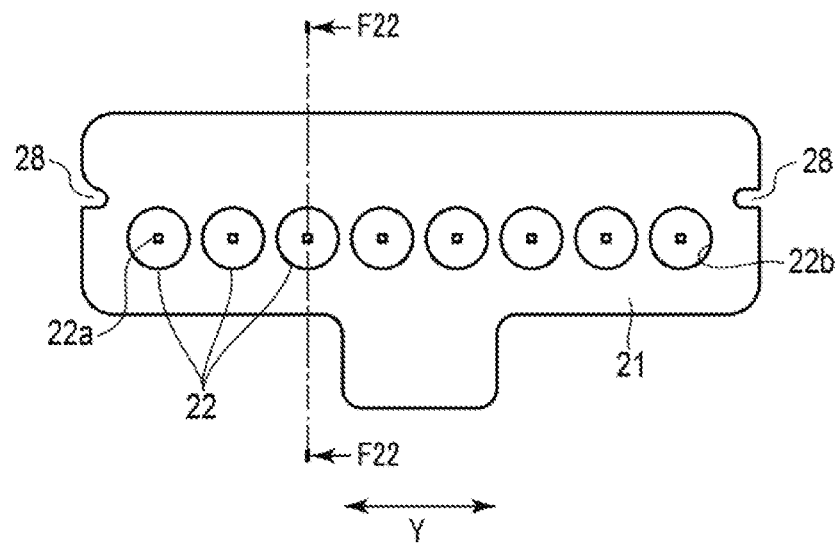
FIG. 20 is a plan view of an upper surface of a chemical liquid discharging device according to the sixth embodiment.
Figure 21:
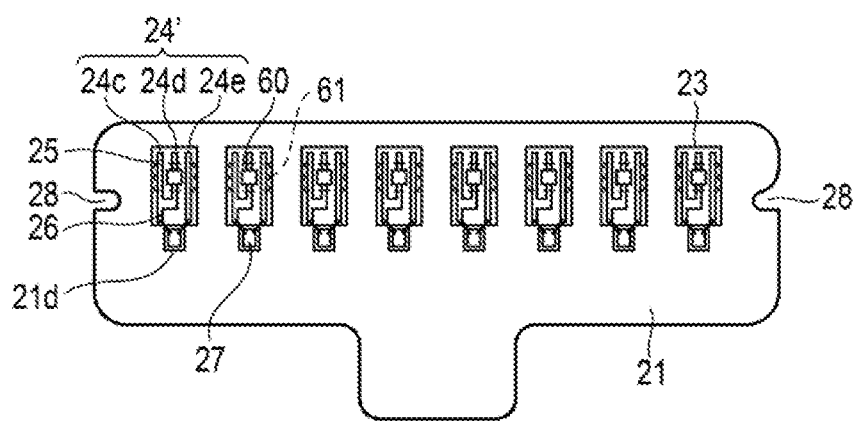
FIG. 21 is a plan view of a lower surface of the chemical liquid discharging device according to the sixth embodiment.
Figure 22:
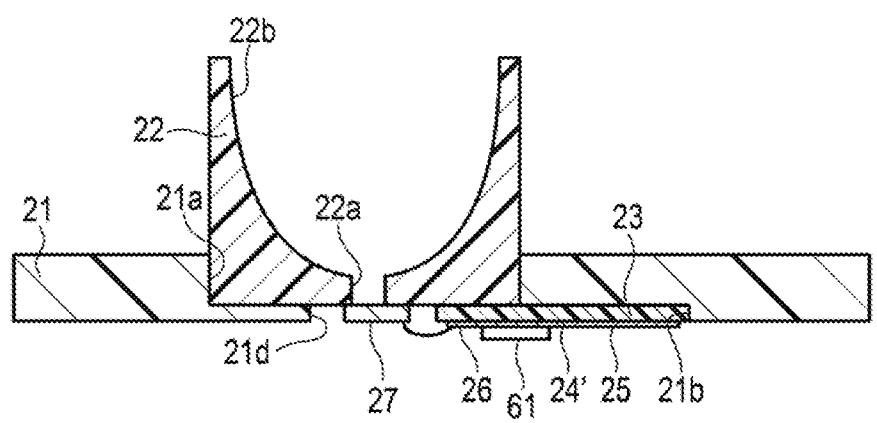
FIG. 22 is a cross-sectional view taken along a line F22-F22 of FIG. 20 according to the sixth embodiment.

FIG. 19 is a perspective view showing a schematic configuration of a discharging system 500c. FIG. 20 is a top view of a chemical liquid discharging device 2c. FIG. 21 is a bottom view showing a surface from which a chemical liquid is discharged from the chemical liquid discharging device 2c. FIG. 22 is a cross-sectional view taken along a line F22-F22 of FIG. 20.

As shown in FIG. 19, the discharging system. 500c includes a chemical liquid dispensing apparatus 1c, the chemical liquid discharging device 2c, the host computer 18, and the like. The discharging system 500c may have more elements in addition to the elements depicted in FIG. 19, or some of the elements depicted in FIG. 19 may be omitted.

The chemical liquid dispensing apparatus 1c includes a reading unit 43.

The reading unit 43 reads a color of a heat sensitive sheet 61 (also referred to as a heat sensitive portion). The heat sensitive sheet 61 is referred to herein as the record portion 30. The reading unit 43 is formed at a position corresponding to the position of the heat sensitive sheet 61. For example, in a case where the chemical liquid discharging device 2 is set in the mounting module 5, the reading unit 43 is formed at a lower portion or an upper portion of the position where a predetermined heat sensitive sheet 61 is located.

The reading unit 43 transmits a signal indicating the color of the heat sensitive sheet 61 to the processor 15.

For example, the reading unit 43 includes an irradiation unit that irradiates the heat sensitive sheet 61 with light and a detection unit (for example, a camera or the like) that detects reflection light.

As shown in FIG. 21, an electrical substrate wiring 24' is patterned and formed on a surface opposite to an adhesive fixing surface of the electrical substrate recessed portion 21b, on the electrical substrate 23.

The electrical substrate wiring 24' includes wiring patterns 24c to 24e.

The wiring pattern 24c electrically connects the driving circuit 11 and the driving element 130 with each other. That is, one end of the wiring pattern 24c is connected to the control signal input terminal 25 for inputting an electrical signal (also referred to as a driving signal) from the driving circuit 11. The other end of the wiring pattern 24c is connected to the electrode terminal connection portion 26 and connected to one end of the driving element 130.

The wiring pattern 24d connects the driving circuit 11 and the wiring pattern 24c with each other. That is, one end of the wiring pattern 24d is connected to the control signal input terminal 25. The other end of the wiring pattern 24d is connected to the middle of the wiring pattern 24c.

The wiring pattern 24d includes a heating unit 60 on the middle thereof. The heating unit 60 is formed as a part of the wiring pattern 24d. That is, the driving circuit 11 is electrically connected to the heating unit 60.

The heating unit 60 generates heat by the operation of the chemical liquid dispensing apparatus 1b. That is, the heating unit 60 generates heat by electric power from the driving circuit 11.

For example, the heating unit 60 is a resistor or the like having a predetermined resistance value.

The wiring pattern 24e electrically connects the driving circuit 11 and the driving element 130 with each other. That is, one end of the wiring pattern 24e is connected to the control signal input terminal 25. The other end of the wiring pattern 24e is connected to the electrode terminal connection portion 26 and connected to the other end of the driving element 130.

The heat sensitive sheet 61 is formed on the electrical substrate wiring 24'. As shown in FIG. 22, the heat sensitive sheet 61 is formed so as to be exposed to the outside. The heat sensitive sheet 61 covers at least the heating unit 60.

The heat sensitive sheet 61 discolors in a case where the temperature of the heat sensitive sheet 61 reaches a predetermined discoloration temperature (for example, 50 degrees). That is, the heat sensitive sheet 61 changes from a color of an initial state to a predetermined color. Once the heat sensitive sheet 61 discolors, even in a case where the temperature of the heat sensitive sheet 61 is reduced, the heat sensitive sheet 61 maintains the color after the discoloration. That is, the heat sensitive sheet 61 indicates whether the heat sensitive sheet 61 is heated once according to the color.

The heat sensitive sheet 61 indicates whether or not the chemical liquid is discharged from the corresponding chemical liquid holding container 22 by a discoloration state. That is, the heat sensitive sheet 61 indicates whether or not the corresponding chemical liquid holding container 22 has been used. The heat sensitive sheet 61 indicates whether or not the chemical liquid holding container 22 has been used according to the discoloration state.

In a case where the heat sensitive sheet 61 does not discolor, the heat sensitive sheet 61 indicates that the corresponding chemical liquid holding container 22 has not been used. In a case where the heat sensitive sheet 61 discolors, the heat sensitive sheet 61 indicates that the corresponding chemical liquid holding container 22 has been used.

The chemical liquid dispensing apparatus 1c includes a driving circuit 11c instead of the driving circuit 11.

The driving circuit 11c has the following function in addition to the function of the driving circuit 11.

The driving circuit 11c applies electric power to the heating unit 60 based on a signal from the processor 15. For example, the driving circuit 11c is connected to the wiring pattern 24c and 24d and applies a predetermined voltage to the heating unit 60.

Next, a control system of the discharging system 500c will be described.

Figure 23:
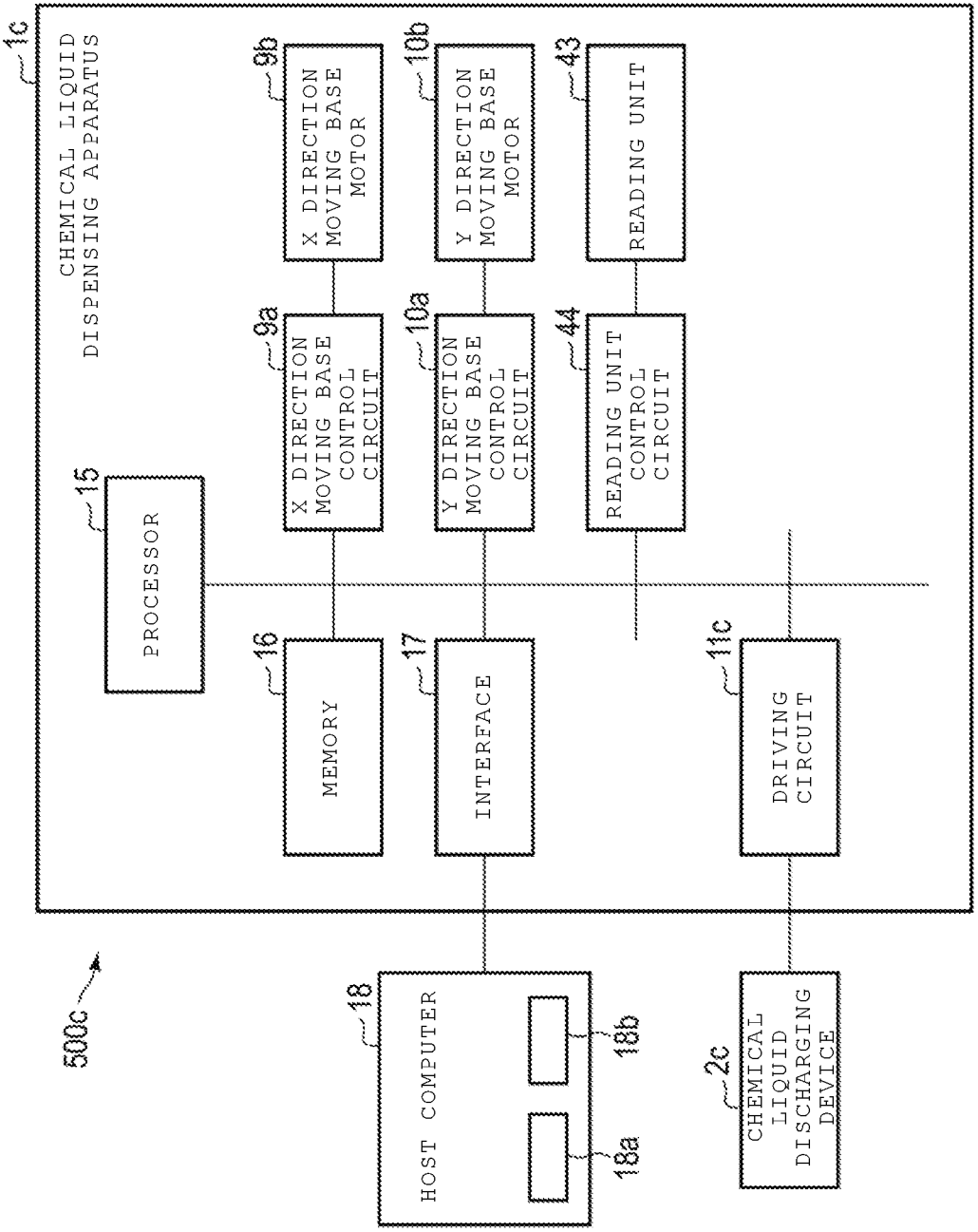
FIG. 23 is a block diagram of a control system of the discharging system according to the sixth embodiment.

FIG. 23 is a block diagram showing the control system of the discharging system 500c.

As shown in FIG. 23, the discharging system 500c includes the chemical liquid dispensing apparatus 1c, the chemical liquid discharging device 2c, the host computer 18, and the like.

As shown in FIG. 23, the chemical liquid dispensing apparatus 1c includes the X direction moving base control circuit 9a, the X direction moving base motor 9b, the Y direction moving base control circuit 10a, the Y direction moving base motor 10b, the driving circuit 11c, the processor 15, the memory 16, the interface 17, the reading unit 43, a reading unit driving circuit 44, and the like. Such units are connected to each other through a data bus. The chemical liquid dispensing apparatus 1c may have more elements in addition to the elements depicted in FIG. 23, or some of the elements depicted in FIG. 23 may be omitted.

The reading unit driving circuit 44 drives the reading unit 43 according to the signal from the processor 15. For example, the reading unit driving circuit 44 supplies electric power to the irradiation unit or the like of the reading unit 43. The reading unit driving circuit 44 transmits a signal from the detection unit or the like of the reading unit 43 to the processor 15.

Next, a function implemented by the processor 15 of the chemical liquid dispensing apparatus 1c will be described. The following function is implemented by the processor 15 executing the program stored in the memory 16 or the like.

First, the processor 15 has a function of reading the color of the heat sensitive sheet 61 using the reading unit 43.

The processor 15 determines whether or not the chemical liquid discharging device 2c is set in the mounting module 5. For example, the processor 15 determines whether or not the chemical liquid discharging device 2c is set in the mounting module 5 according to a signal from a sensor (not specifically depicted in the drawing).

In a case where it is determined that the chemical liquid discharging device 2c is set in the mounting module 5, the processor 15 causes to the reading unit 43 to read the color of the heat sensitive sheet 61. That is, the processor 15 requests a signal indicating the read color to the reading unit 43. The processor 15 acquires the color of the heat sensitive sheet 61 based on the signal from the reading unit 43.

In a case where the chemical liquid discharging device 2c is located at a position where the reading unit 43 is not able to read the color of the heat sensitive sheet 61, the processor 15 controls the X direction moving base motor 9b or the Y direction moving base motor 10b to move the chemical liquid discharging device 2c to a position where the reading unit 43 is able to read the color of the heat sensitive sheet 61.

The processor 15 read the color of each heat sensitive sheet 61 corresponding to each chemical liquid holding container 22.

The processor 15 has a function of determining whether or not the chemical liquid discharging device 2c has been used based on the acquired each color.

The processor 15 determines whether or not the chemical liquid holding container 22 has been used based on the acquired color. That is, in a case where it is determined that the color of the heat sensitive sheet 61 is the color after the discoloration, the processor 15 determines that the chemical liquid holding container 22 has been used.

The processor 15 determines whether or not the chemical liquid discharging device 2c has been used based on a use situation of each chemical liquid holding container 22.

For example, in a case at least one chemical liquid holding container 22 has been used, the processer 15 determines that the chemical liquid discharging device 2c has been used. In a case where any chemical liquid holding container 22 has not been used, the processer 15 determines that the chemical liquid discharging device 2c has not been used.

The processor 15 has a function of discharging the chemical liquid from the chemical liquid discharging device 2c based on whether or not the chemical liquid discharging device 2c has been used.

In a case where it is determined that the chemical liquid discharging device 2c has not been used, the processor 15 discharges the chemical liquid from the chemical liquid discharging device 2c.

The operation of causing the chemical liquid discharging device 2c to discharge the chemical liquid by the processor 15 is the same as that of First Embodiment, and thus descriptions thereof are omitted.

Figure 24:
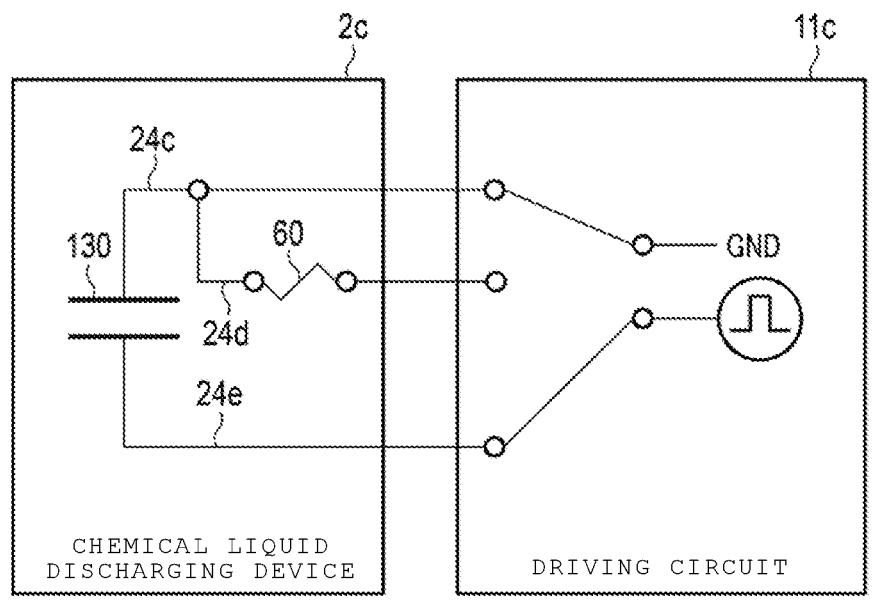
FIG. 24 is a diagram showing a connection example of a driving circuit according to the sixth embodiment.

FIG. 24 shows an example of a connection relationship in a case where the processor 15 performs the discharge operation using the driving circuit 11c.

As shown in FIG. 24, the driving circuit 11c is connected to the driving element 130. The driving circuit 11c is electrically connected to the wiring patterns 24c and 24e. Here, the wiring pattern 24c is connected to a GND. The wiring pattern 24e is connected to an electric power output unit of the driving circuit 11c.

The driving circuit 11c applies a voltage for discharging the chemical liquid to the wiring pattern 24e and the driving element 130 based on a signal from the processor 15.

In a case where it is determined that the chemical liquid discharging device 2c has been used, the processor 15 does not discharge the chemical liquid from the chemical liquid discharging device 2c.

For example, in a case where it is determined that the chemical liquid discharging device 2c has been used, the processor 15 does not discharge the chemical liquid even though the processor 15 receives the discharge signal. The processor 15 transmits a signal indicating that the chemical liquid discharging device 2c has been used to the host computer 18 through the interface 17.

In a case where the host computer 18 receives the corresponding signal, the host computer 18 displays a warning or the like indicating that the chemical liquid discharging device 2c has been used on the display unit 18b or the like.

The processor 15 has a function of heating the heat sensitive sheet 61 using the heating unit 60 in a case where the processor 15 discharges the chemical liquid.

In a case where the discharge of the chemical liquid is completed, the processor 15 applies electric power to the heating unit 60 corresponding to the chemical liquid holding container 22 that holds the discharged chemical liquid. For example, the processor 15 connects the driving circuit 11c and the wiring patterns 24c and 24d with each other. The processor 15 applies a heating voltage to the driving circuit 11c. As a result, the heating voltage is applied to the heating unit 60. The heating unit 60 heats the heat sensitive sheet 61 by the heating voltage and heats the heat sensitive sheet 61 so that the temperature of the heat sensitive sheet 61 reaches the discoloration temperature. The heat sensitive sheet 61 discolors by the heat of the heating unit 60.

Figure 25:
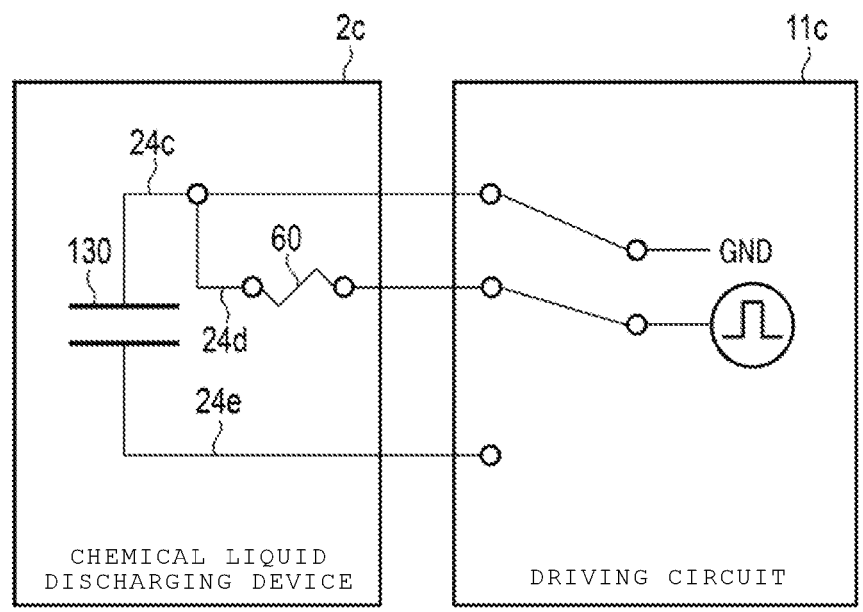
FIG. 25 is a diagram showing the connection example of the driving circuit according to the sixth embodiment.

FIG. 25 shows an example of a connection relationship in a case where the processor 15 applies the electric power to the heating unit 60 using the driving circuit 11c.

As shown in FIG. 25, the driving circuit 11c is connected to the heating unit 60. That is, the driving circuit 11c is electrically connected to the wiring patterns 24c and 24d. Here, the wiring pattern 24c is connected to the GND. The wiring pattern 24d is connected to an electric power output unit of the driving circuit 11c.

The driving circuit 11c applies the heating voltage to the heating unit 60 based on a signal from the processor 15.

The chemical liquid dispensing apparatus 1c may include the heating unit. The processor 15 may apply a voltage to the heating unit provided in the chemical liquid dispensing apparatus 1c using the driving circuit 11c or the like to heat the heat sensitive sheet 61.

The method of heating the heat sensitive sheet 61 by the processor 15 is not limited to a specific method.

Next, an operation example of the processor 15 of the chemical liquid dispensing apparatus 1c will be described.

Figure 26:
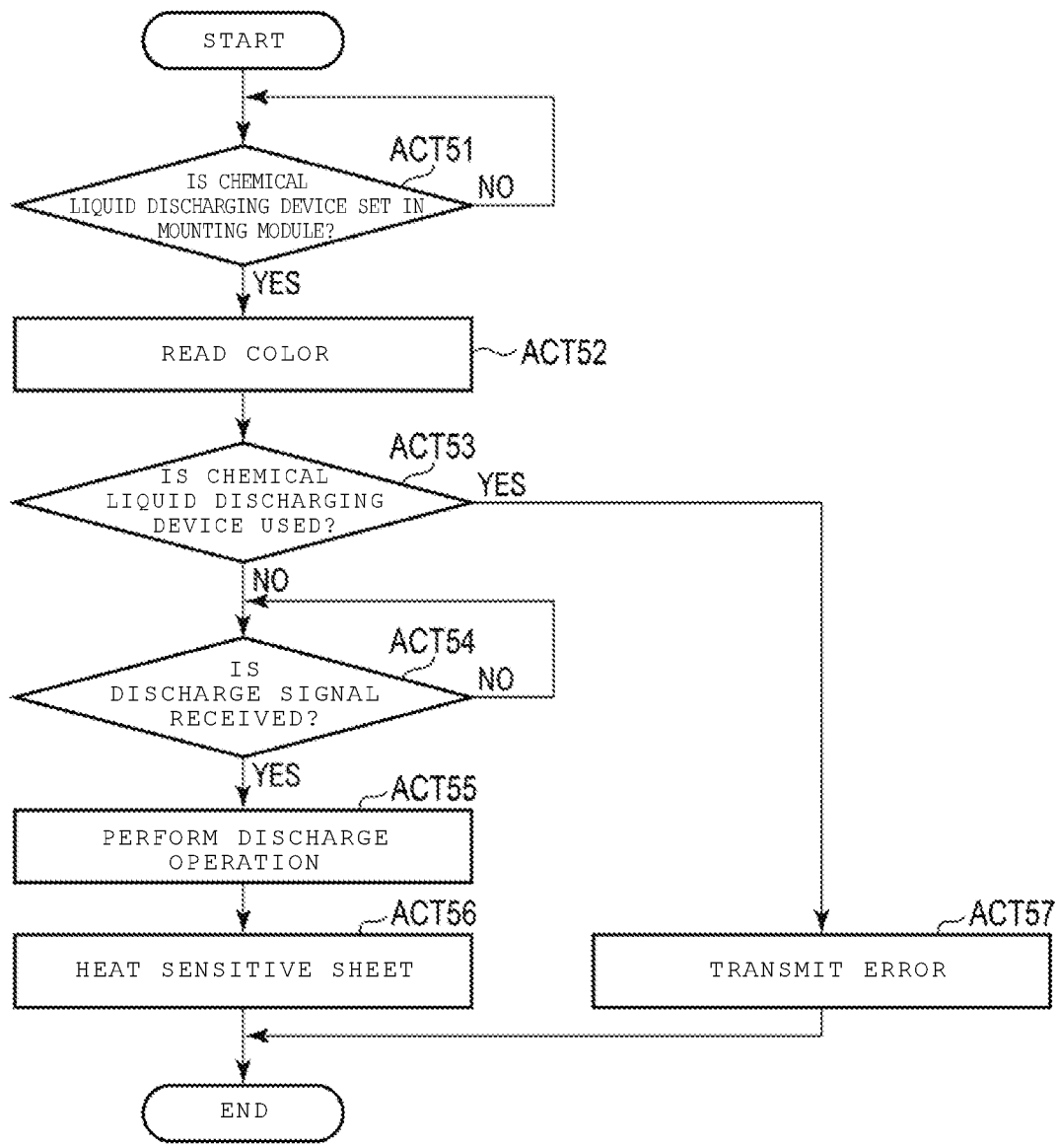
FIG. 26 is a flowchart showing an operation example of a chemical liquid dispensing apparatus according to the sixth embodiment.

FIG. 26 is a flowchart for describing the operation example of the processor 15 of the chemical liquid dispensing apparatus 1c.

First, the processor 15 determines whether or not the chemical liquid discharging device 2c is set in the mounting module 5 (ACT51). In a case where it is determined that the chemical liquid discharging device 2c is not set in the mounting module 5 (ACT51, NO), the processor 15 returns to ACT51.

In a case where it is determined that the chemical liquid discharging device 2c is set in the mounting module 5 (ACT51, YES), the processor 15 reads the color of each heat sensitive sheet 61 (ACT52). In a case where the color of each heat sensitive sheet 61 is read, the processor 15 determines whether or not the chemical liquid discharging device 2c has been used based on the color of each heat sensitive sheet 61 (ACT53).

In a case where it is determined that the chemical liquid discharging device 2c has not been used (ACT53, NO), the processor 15 determines whether or not the discharge signal has been received through the interface 17 (ACT54). In a case where it is determined that the discharge signal has not been received through the interface 17 (ACT54, NO), the processor 15 returns to ACT54.

In a case where it is determined that the discharge signal has been received through the interface 17 (ACT54, YES), the processor 15 causes the chemical liquid discharging device 2c to discharge the chemical liquid according to the discharge signal (ACT55).

In a case where the chemical liquid discharging device 2c is caused to discharge the chemical liquid, the processor 15 heats the heat sensitive sheet 61 (ACT56).

In a case where it is determined that the chemical liquid discharging device 2c has been used (ACT53, YES), the processor 15 transmits the signal indicating that the chemical liquid discharging device 2c has been used to the host computer 18 through the interface 17 (ACT57).

In a case where the heat sensitive sheet 61 is heated (ACT56), or in a case where the signal indicating that the chemical liquid discharging device 2c has been used is transmitted to the host computer 18 (ACT57), the processor 15 ends the operation.

The processor 15 may determine whether or not the chemical liquid is discharged for each chemical liquid holding container 22 of the chemical liquid discharging device 2c.

In a case where it is determined whether each chemical liquid holding container 22 has been used, the processor 15 receives the discharge signal from the host computer 18 at a predetermined timing. Here, the discharge signal instructs the discharge of the chemical liquid from a predetermined chemical liquid holding container 22. In a case where the chemical liquid holding container 22 that discharges the chemical liquid has not been used, the processor 15 discharges the chemical liquid from the chemical liquid holding container 22 according to the discharge signal. In a case where the discharge operation is ended, the processor 15 heats the heat sensitive sheet 61 corresponding to the corresponding chemical liquid holding container 22.

In a case where the chemical liquid holding container 22 that discharges the chemical liquid has been used, the processor 15 does not perform the discharge operation even though the processor 15 receives the discharge signal. In this case, the processor 15 may transmit a signal indicating that the corresponding chemical liquid holding container 22 has been used to the host computer 18.

The discharging system configured as described above reads the color of the heat sensitive sheet of the chemical liquid discharging device. The discharging system determines whether or not the chemical liquid holding container has been used based on the read color. The discharging system determines whether or not the chemical liquid discharging device has been used based on the use situation of the chemical liquid holding container. In a case where the chemical liquid discharging device has been used, the discharging system does not discharge the chemical liquid from the chemical liquid discharging device.

In a case where the chemical liquid discharging device discharges the chemical liquid, the discharging system heats the heat sensitive sheet to discolor the heat sensitive sheet.

As a result, the discharging system can prevent the discharge of the chemical liquid reusing the chemical liquid discharging device that has been used once.

The heat sensitive sheet of the chemical liquid discharging device configured as described above indicates that the corresponding chemical liquid discharging device has been used by the color. As a result, the chemical liquid discharging device can present that the chemical liquid discharging device has been used by the color to the user.

Seventh Embodiment

A chemical liquid discharging device according to Seventh Embodiment is different from that of First Embodiment in a point that the chemical liquid discharging device according to Seventh Embodiment discharges the chemical liquid by a thermal jet method. Therefore, the same reference numerals are used for the components that are substantially the same as those of First Embodiment, and the description of repeated components may be omitted.

Figure 27:
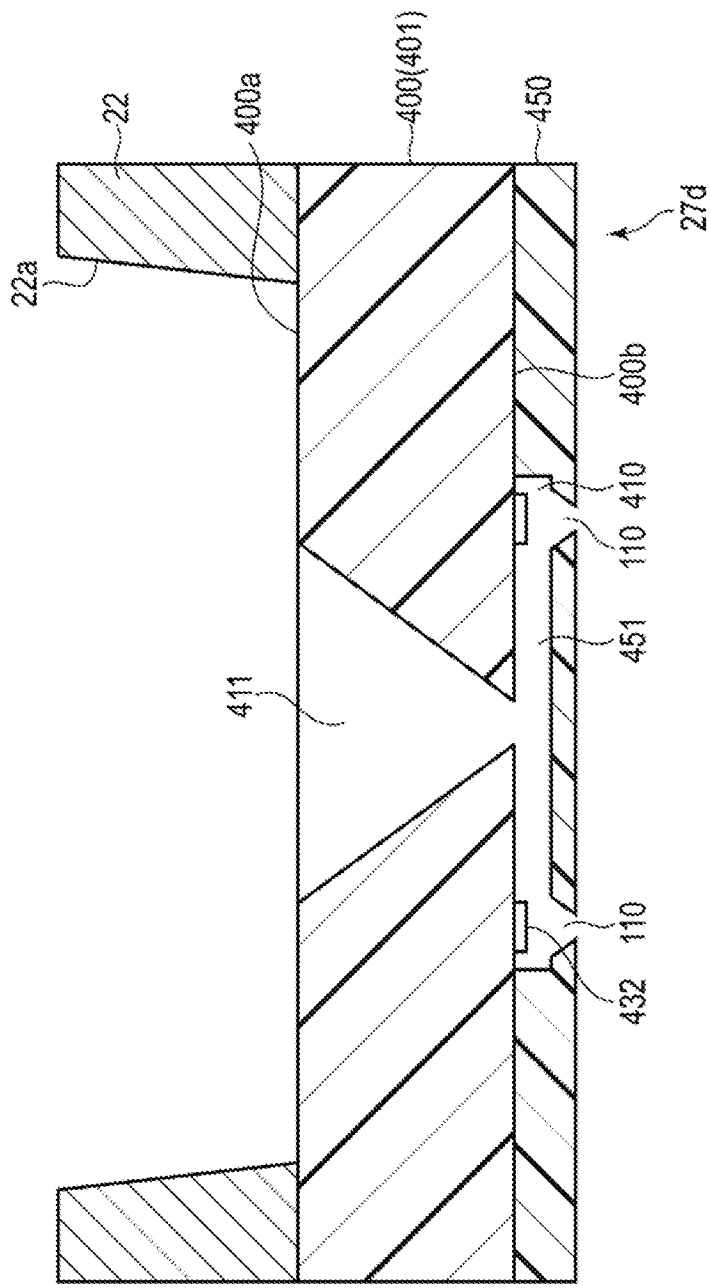
FIG. 27 is a cross-sectional view taken along a line F27-F27 of FIG. 4 according to a seventh embodiment.

A schematic configuration of a discharging system 500d according to the seventh embodiment is shown in FIG. 1. A top view of a chemical liquid discharging device 2d is shown in FIG. 2. A bottom view from a surface from which a chemical liquid is discharged from the chemical liquid discharging device 2d is shown in FIG. 3. A cross-sectional view of the chemical liquid discharging device 2d taken along a line F4-F4 in FIG. 2 is shown in FIG. 4. FIG. 27 is a cross-sectional view taken along a line F27-F27 in FIG. 4.

The discharging system 500d includes the chemical liquid discharging device 2d instead of the chemical liquid discharging device 2.

The chemical liquid discharging device 2d includes a chemical liquid discharge array 27d instead of the chemical liquid discharge array 27.

As shown in FIG. 27, the chemical liquid discharge array 27d is formed by stacking a silicon substrate 400 and a photosensitive resin 450. An inlet port 411 connected to the lower surface opening 22a of the chemical liquid outlet port of the chemical liquid holding container 22 is formed on a surface side (also referred to as a second surface 400a) of the silicon substrate 400. A thin film heat transfer heater 432 that is an actuator and a wiring that is connected to the thin film heat transfer heater 432 (not specifically depicted in the drawing) are formed on a rear surface side (also referred to as a first surface 400b) of the silicon substrate 400. The thin film heat transfer heater 432 is electrically connected to the electrode terminal connection portion 26.

The photosensitive resin 450 is a substrate on which a pressure chamber 410 is formed. A flow path 451 connected to the inlet port 411, the pressure chamber 410, and the nozzle 110 are formed on the photosensitive resin 450. The pressure chamber 410 is an area where the thin film heat transfer heater 432 is formed in the flow path 451. The thin film heat transfer heater 432 generates heat by electric power supplied from a wiring. The chemical liquid in the pressure chamber 410 is heated and boiled by the thin film heat transfer heater 432, and thus the chemical liquid is discharged from the nozzle 110.

For example, a plurality of nozzles 110 is arranged in six rows in the X direction and two rows in the Y direction. The plurality of nozzles 110 is positioned in the inside of the lower surface opening 22a of the chemical liquid outlet port of the chemical liquid holding container 22.

Next, an operation of discharging the chemical liquid will be described. The lower surface opening 22a of the lower portion of the chemical liquid holding container 22 is connected to the inlet portion 411 and the flow path 451 of the chemical liquid discharge array 27d. The chemical liquid held in the chemical liquid holding container 22 is filled from the lower surface opening 22a of the chemical liquid holding container 22 to each pressure chamber 410 in the flow path 451 formed on the photosensitive resin 450 through the inlet portion 411 formed on the silicon substrate 400.

In this state, the voltage control signal input to the control signal input terminal 25 of the electrical substrate wiring 24 from the driving circuit 11 is applied to a plurality of thin film heat transfer heater 432 of the chemical liquid discharge array 27d. Therefore, the plurality of thin film heat transfer heater 432 generates heat, and the chemical liquid in the pressure chamber 410 is heated and boiled. As a result, the chemical liquid is discharged from the nozzle 110 as a chemical liquid droplet. A predetermined amount of chemical liquid is dispensed from the nozzle 110 to the well opening 300 of the microplate 4.

In the thermal jet method, the chemical liquid is come into contact with the thin film heat transfer heater 432 having a temperature equal to or higher than 300° C. Therefore, in the thermal jet method, it is preferable that the chemical liquid with high heat resistance that is not discolored even in a case where the chemical liquid is come into contact with a heater having a temperature equal to or higher than 300° C. is discharged.

In the discharging system configured as described above, the record portion of the chemical liquid discharging device indicates that the record portion has been used by the opening of the record portion. The discharging system reads the record portion to recognize whether or not the chemical liquid discharging device has been used. In a case where the chemical liquid discharging device has been used, the discharging system does not discharge the chemical liquid from the chemical liquid discharging device.

In a case where the chemical liquid discharging device discharges the chemical liquid, the discharging system opens the record portion of the chemical liquid discharging device.

As a result, the discharging system can prevent the discharge of the chemical liquid reusing the chemical liquid discharging device that has been used once.

Since the record portion of the used chemical liquid discharging device is opened, the discharging system can present that the chemical liquid discharging device has been used to the user.

The discharging system 500d may have the characteristics of Second to Sixth Embodiments.

The chemical liquid discharging device configured as described above has a simple structure compared to a piezo jet method, and thus it is possible to miniaturize the actuator. Therefore, in the chemical liquid discharging device, the nozzles can be arranged at high density compared to the piezo jet method.

In the First to Sixth embodiments described above, the driving element 130 that is the driving unit has a circular shape. However, the shape of the driving unit is not limited. For example, the shape of the driving unit may be a diamond shape, an ellipse shape, or the like. The shape of the pressure chamber 210 is not limited to a circular shape, and the shape of the pressure chamber 210 may be a diamond shape, an ellipse shape, a rectangular shape, or the like.

In the First to Sixth embodiments, the nozzle 110 is disposed at the center of the driving element 130, however, as long as the chemical liquid of the pressure chamber 210 is able to be discharged, the position of the nozzle 110 is not limited. For example, the nozzle 110 may be formed the outside of the driving element 130 rather than the inside of the area of the driving element 130.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid discharging device to be used with mounted on a mounting portion of a liquid dispensing apparatus, the liquid discharging device comprising:
    a base member of a flat planar shape with engaging portions for mounting to a mounting portion of a liquid dispensing apparatus;
    a discharging portion on the base member and configured to discharge a liquid based on a control signal from the liquid dispensing apparatus; and
    a sheet material connected to the discharging portion and configured to indicate a use history of whether or not the liquid has been discharged from the discharging portion.

2. The liquid discharging device according to claim 1, wherein the discharging portion is configured to discharge the liquid based on the control signal from the liquid dispensing apparatus when the use history indicates the liquid discharging device has not been previously used for discharging the liquid.

3. The liquid discharging device according to claim 1, further comprising:
a film that covers a liquid holding container in the discharging portion.

4. The liquid discharging device according to claim 1, wherein the use history is indicated by a shape of the sheet material.

5. The liquid discharging device according to claim 1, wherein the use history is indicated by a color of the sheet material.

6. The liquid discharging device according to claim 5, further comprising:
a heater configured to heat the sheet material to change the color.

7. A liquid dispensing apparatus, comprising:
a mounting portion on which a liquid discharging device is mounted by engagement with engaging portions of a flat planar base member of the liquid discharging device;
a reading unit configured to detect a use history of the liquid discharging device that is indicated by a sheet material which is part of the liquid discharging device, the use history indicating whether or not liquid has been previously discharged by a discharging portion of the liquid discharging device; and
a processor configured to supply a control signal to cause the liquid discharging device mounted on the mounting portion to discharge a liquid only if the use history, as detected by the reading unit, indicates the discharging portion of the liquid discharging device has not been previously used for discharging the liquid.

8. The liquid dispensing apparatus according to claim 7, further comprising:
a forming portion including a cutting blade configured to change a shape of the sheet material to change the use history of the liquid discharging device mounted on the mounting portion.

9. The liquid dispensing apparatus according to claim 7, wherein the liquid discharging device comprises a heater configured to heat the sheet material to change a color of the sheet material to change the use history of the liquid discharging device mounted on the mounting portion.

10. The liquid dispensing apparatus according to claim 9, further comprising:
a driving circuit connected to the heater and configured supply electric power to the heater, wherein
the processor is further configured to control the driving circuit to supply the electric power to the heater after a discharge of the liquid by the liquid discharging device.

11. A liquid dispensing apparatus, comprising:
a liquid discharging device;
a mounting portion to which the liquid discharging device is mounted by engagement with engaging portions of a flat planar base member of the liquid discharging device;
a reading unit configured to detect a use history of the liquid discharging device that is indicated by a sheet material which is part of the liquid discharging device, the use history indicating whether or not liquid has been previously discharged by a discharging portion of the liquid discharging device; and
a processor configured to supply a control signal to cause the liquid discharging device mounted on the mounting portion to discharge a liquid only if the use history of the liquid discharging device, as detected by the reading unit, indicates the discharging portion of the liquid discharging device has not been previously used for discharging the liquid.

12. The liquid dispensing apparatus according to claim 11, further comprising:
a film that covers a liquid holding container in the discharging portion.

13. The liquid dispensing apparatus according to claim 11, wherein the use history is indicated by a shape of the sheet material.

14. The liquid dispensing apparatus according to claim 13, further comprising:
a forming portion including a cutting blade configured to change the shape of the sheet material to change the use history of the liquid discharging device mounted on the mounting portion.

15. The liquid dispensing apparatus according to claim 11, wherein the use history is indicated by a color of the sheet material.

16. The liquid dispensing apparatus according to claim 15, wherein the liquid discharging device further comprises a heater configured to heat the sheet material to change the color.

17. The liquid dispensing apparatus according to claim 11, wherein the reading unit comprises:
an irradiation unit configured to irradiate the sheet material with light; and
a detection unit configured to detect reflected light from the sheet material.

18. The liquid dispensing apparatus according to claim 11, wherein
the liquid discharging device further comprises:
a presentation unit, the presentation unit being configured to store identification information;
an interface configured to communicate with a server; and
an acquisition unit configured to acquire the identification information from the presentation unit, and
the processor is configured to:
acquire the use history corresponding to the identification information from the server through the interface, and
transmit a request to the server to store information indicating that the discharging portion has discharged the liquid as the use history through the interface when the processor causes the discharging portion to discharge the liquid.

* * * * *